(12) United States Patent
Murai et al.

(10) Patent No.: US 8,301,357 B2
(45) Date of Patent: Oct. 30, 2012

(54) VARIABLE OPERATION ANGLE MECHANISM AND APPARATUS FOR AND METHOD OF CONTROLLING ENGINE

(75) Inventors: Atsushi Murai, Isesaki (JP); Tomoyuki Murakami, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 831 days.

(21) Appl. No.: 12/470,710

(22) Filed: May 22, 2009

(65) Prior Publication Data

US 2009/0292451 A1    Nov. 26, 2009

(30) Foreign Application Priority Data

May 26, 2008 (JP) ................. 2008-136850

(51) Int. Cl.
*F01L 13/00* (2006.01)
*F01L 1/344* (2006.01)
*F01L 1/34* (2006.01)
*F02D 41/04* (2006.01)

(52) U.S. Cl. .................... 701/105; 123/90.16
(58) Field of Classification Search .......... 701/105, 701/102; 123/90.15–90.17, 90.31
See application file for complete search history.

(56) References Cited

U.S. PATENT DOCUMENTS

| | | | |
|---|---|---|---|
| 6,513,468 B2 | 2/2003 | Takahashi et al. | |
| 6,820,579 B2 * | 11/2004 | Kawamura et al. | 123/90.15 |
| 7,107,951 B2 | 9/2006 | Urushihata et al. | |
| 7,201,124 B2 | 4/2007 | Neubauer et al. | |
| 7,403,849 B1 | 7/2008 | Watanabe et al. | |
| 7,484,497 B2 | 2/2009 | Watanabe et al. | |
| 7,997,241 B2 * | 8/2011 | Kamiyama et al. | 123/90.17 |
| 2004/0011311 A1 | 1/2004 | Takahashi | |
| 2006/0229797 A1 | 10/2006 | Sawada et al. | |
| 2007/0095311 A1 | 5/2007 | Tateno et al. | |
| 2008/0288155 A1 | 11/2008 | Watanabe et al. | |
| 2009/0255510 A1 | 10/2009 | Mashiki et al. | |

FOREIGN PATENT DOCUMENTS

| | | |
|---|---|---|
| JP | 08-177434 A | 7/1996 |
| JP | 2001-065321 A | 3/2001 |
| JP | 2005-291014 A | 10/2005 |
| JP | 2006-144723 A | 6/2006 |
| JP | 2006-348774 A | 12/2006 |

(Continued)

OTHER PUBLICATIONS

U.S. Appl. No. 12/470,696, filed May 22, 2009, Murai et al.
A. Murai, U.S. PTO Office Action, U.S. Appl. No. 12/470,696, dated Dec. 30, 2011, 11 pages.

(Continued)

*Primary Examiner* — Hieu T Vo
(74) *Attorney, Agent, or Firm* — Foley & Lardner LLP

(57) ABSTRACT

The present invention relates to a variable operation angle mechanism that can improve engine performance at transient operation by optimally setting a ratio between change amounts of opening and closing timings accompanying a variation in valve operation angle of intake valve, and relates to an apparatus for and a method of controlling an engine including the variable operation angle mechanism. In the variable operation angle mechanism, ratio RIVO of change amount of opening timing IVO of intake valve to change amount of valve operation angle is set to be 20% or more and 40% or less, and preferably, to be 30%. In engine including a variable valve timing mechanism varying a rotating phase of intake camshaft relative to crankshaft and the variable operation angle mechanism, a target phase change amount varied by the variable valve timing mechanism is corrected for phase change amount accompanying the variation in the valve operation angle.

14 Claims, 26 Drawing Sheets

FOREIGN PATENT DOCUMENTS

| | | |
|---|---|---|
| JP | 2007-120410 A | 5/2007 |
| JP | 2007-332942 A | 12/2007 |
| WO | WO 2006/025565 A1 | 3/2006 |

OTHER PUBLICATIONS

A. Murai, U.S. PTO Notice of Allowance, U.S. Appl. No. 12/470,696, dated May 18, 2012, 5 pages.

* cited by examiner

VARIABLE OPERATION ANGLE MECHANISM AND APPARATUS FOR AND METHOD OF CONTROLLING ENGINE

BACKGROUND OF THE INVENTION

1. Field of the Invention

The present invention relates to a variable operation angle mechanism which varies a valve operation angle of an intake valve and, to an apparatus for and a method of controlling an engine which is provided with the variable operation angle mechanism.

2. Description of the Related Art

Japanese Laid-open (Kokai) Patent Application Publication No. 2005-291014 discloses a variable operation angle mechanism suitable for use in an engine to vary a center phase of a valve operation angle in an advance direction in response to a decrease in the valve operation angle of an intake valve.

Although this Patent publication fails to specifically disclose a change amount of the center phase of the valve operation angle relative to a variation in the valve operation angle, it is to be understood that the change amount of the central phase of the valve operation angle highly affects a response at a transient operation of the engine, a fuel consumption at the transient operation, and an engine-stall resistance.

Thus, if the variation characteristic of the center phase of the valve operation angle relative to the change amount thereof is improper, the engine performance during the transient operation thereof might be greatly degraded.

SUMMARY OF THE INVENTION

In view of the above problems, a primary object of the present invention is to provide a novel technique for enabling the change amount of the center phase of the valve operation angle relative to the change amount thereof to be set optimum so that the response at the transient operation, the fuel consumption at the transient operation, and the engine-stall resistance are improved, respectively. Another object of the present invention is to provide an improved variable operation angle mechanism, and novel engine controlling method and apparatus that are capable of achieving the above-mentioned primary object.

In order to achieve the above objects, the present invention provides such a novel technical concept of a variable operation angle mechanism provided for varying a valve operation angle of an intake valve, having an arrangement thereof in which the variable operation angle mechanism advances a center phase of the valve operation angle in response to a decrease in the valve operation angle, and a control is executed in a manner such that a ratio of a change amount of an opening timing of the intake valve to a change amount of the valve operation angle is set to be equal to or more than 20% and equal to or less than 40%.

The other objects and features of this invention will be understood from the ensuing description with reference to the accompanying drawings.

DESCRIPTION OF THE PREFERRED EMBODIMENTS

Figure 1:
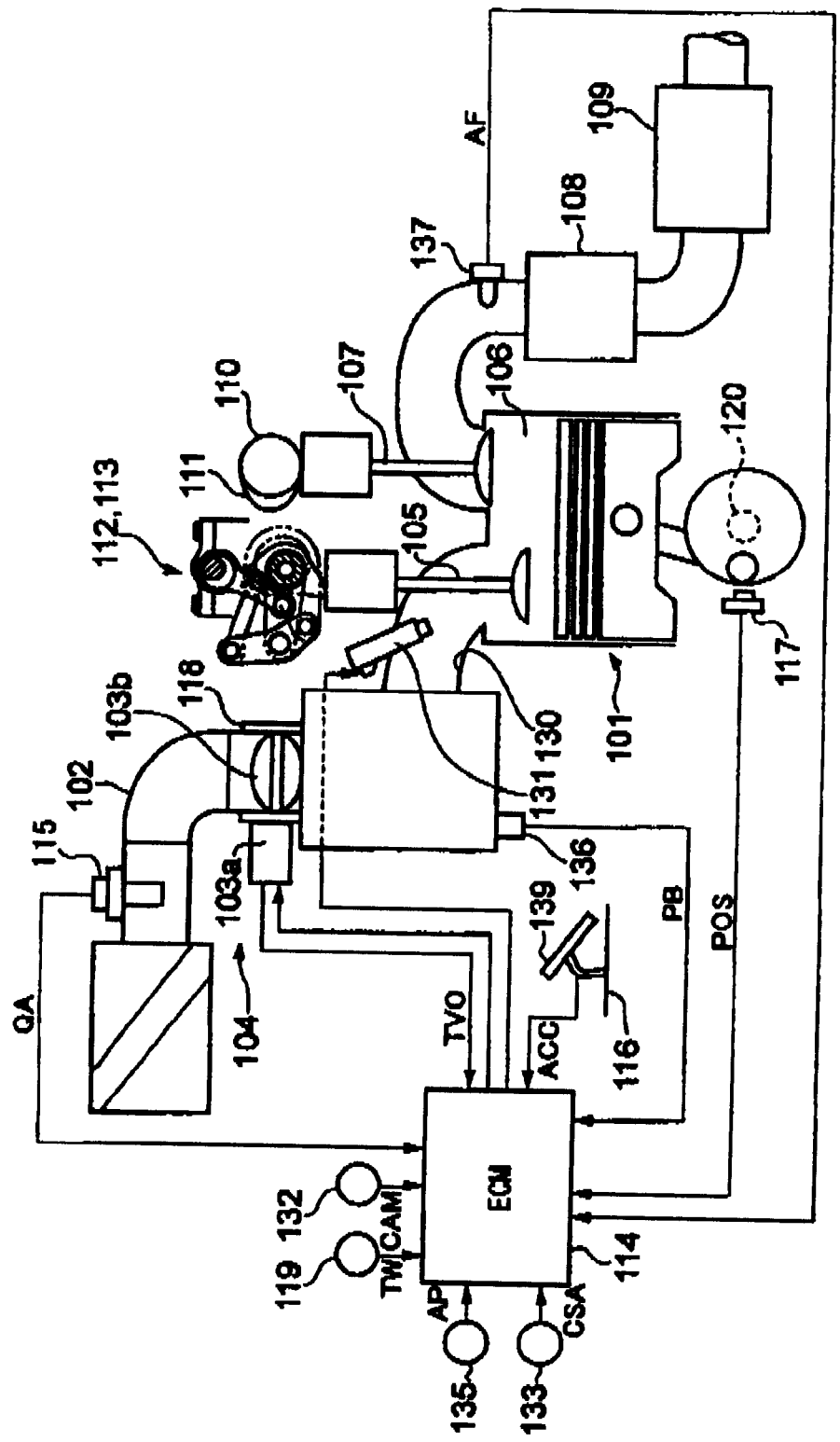
FIG. 1 is a block diagram illustrating a systematic construction of an engine according to an embodiment of the present invention.

FIG. 1 is a block diagram illustrating a systematic construction of a vehicular engine provided with a variable operation angle mechanism according to the present invention.

Referring to FIG. 1, in an intake pipe 102 of an engine (e.g., an internal combustion engine) 101, there is interposed an electronically controlled throttle 104 in which a throttle motor 103a varies an opening degree of a throttle valve 103b.

Via electronically controlled throttle 104 and an intake valve 105, suction of the air takes place into a combustion chamber 106.

In an intake port 130 on an upstream side of intake valve 105, a fuel injection valve 131 is provided.

Fuel injection valve 131 injects a fuel of an amount proportional to an injection pulse width of an injection pulse signal provided from an ECM (engine control module) 114.

Then, the fuel in combustion chamber 106 is ignited and combusted by a spark ignition by a not-shown spark plug.

The engine may be an in-cylinder direct injection type engine in which fuel injection valve 131 directly injects fuel into combustion chamber 106, and alternatively the engine may be a compression self-ignition type engine instead of the spark ignition type engine.

Combustion exhaust gas in combustion chamber 106 is discharged via an exhaust valve 107 and is purified in a front catalytic converter 108 and a rear catalytic converter 109, and is then discharged into the atmosphere.

Exhaust valve 107 is driven by a cam 111 disposed on an exhaust camshaft 110, while a valve lift amount, a valve operation angle, and a valve timing are kept constant.

On the other hand, a lift characteristic of intake valve 105 is varied by a VEL (variable operation angle mechanism) 112 and a TVC (variable valve timing mechanism) 113.

VEL 112 is a mechanism that continuously varies the valve operation angle of intake valve 105 together with the valve lift amount thereof, namely, if the valve operation angle is increased, the valve lift amount is also increased in response to the increase in the valve operation angle, at the same time.

VTC 113 is a mechanism that varies a rotating phase of an intake camshaft 13 relative to a crankshaft 120, to thereby continuously vary a phase of the valve operation angle of intake valve 105 relative to crankshaft 120.

ECM 114 having a built-in micro computer sets a fuel injection amount (injection pulse width), an ignition timing, a target intake air amount, a target intake pipe negative pressure, and the like by performing computation processes according to a previously-stored program, and ECM 114 outputs control signals to fuel injection valve 131, a power transistor for a spark coil (not shown in the figures), electronically controlled throttle 104, VEL 112, VTC 113, and the like, based on these set values.

ECM 114 receives detection signals from a various kinds of sensors.

As the various sensors, there are disposed an air flow sensor 115 that detects an intake air amount QA of engine 101, an accelerator pedal sensor 116 that detects an opening degree ACC of an accelerator pedal 139 operated by a driver of a vehicle, a crank angle sensor 117 that outputs a unit crank angle signal POS at each unit crank angle, a throttle sensor 118 that detects an opening degree TVO of throttle valve 103b, a water temperature sensor 119 that detects a cooling water temperature TW of engine 101, a cam sensor 132 that outputs a cam signal CAM at each reference position of intake camshaft 13, an angle sensor 133 that detects a rotating angle CSA of a control shaft 30 constituting VEL 112, an atmospheric pressure sensor 135 that detects an atmospheric pressure AP, an intake pressure sensor 136 that detects an intake pressure PB on the downstream of throttle valve 103b, an air-fuel ratio sensor 137 that is disposed on the upstream side of front catalytic converter 108 and detects an air-fuel ratio AF based on an oxygen concentration of an exhaust gas, and the like.

Unit crank angle signal POS is set so that a few, for example, one or two, lacks of unit crank angle signal POS occur at every crank angle corresponding to the ignition timing among cylinders. The lacking position of unit crank angle signal POS is detected according to an output cycle of unit crank angle signal POS, and a reference crank angle position REF is detected based on the lacking position.

Based on a phase difference between cam signal CAM output from cam sensor 132 and reference crank angle position REF, an advance amount of the valve timing operated by VTC 113 is detected.

Furthermore, a rotating speed NE of engine 101 is calculated based on a detection cycle of reference crank angle position REF or the number of generated unit crank angle signal POS per unit time.

Next, the structure of VEL 112 will be described in detail with reference to FIGS. 2 through 4.

VEL 112 is provided with: a pair of intake valves 105, 105 slidably disposed on a cylinder head 11; a hollow intake camshaft 13 rotatably supported on the top of cylinder head 11; a drive cam 15 secured to intake camshaft 13 by press-fitting or the like; a pair of oscillating cams 17, 17 disposed coaxially with drive cam 15 and actuates each of intake valves 105, 105 to open via valve lifters 16, 16; rocker arm 18, one end section 18a of which is linked to drive cam 15 via a link arm 19 and the other end section 18b of which is linked to oscillating cams 17, 17 via a link member 20; a support arm 21, a base end section 21a of which is rotatably supported on intake camshaft 13 and a tip end section 21b of which is coupled to a swing support of rocker arm 18; and drive means 22 that tilts support arm 21 for an angle within a predetermined angle range.

To intake camshaft 13, a rotating force is transmitted from crankshaft 120 via a cam sprocket disposed on one end section of intake camshaft 13 and a timing chain wounded around the cam sprocket.

Figure 4:
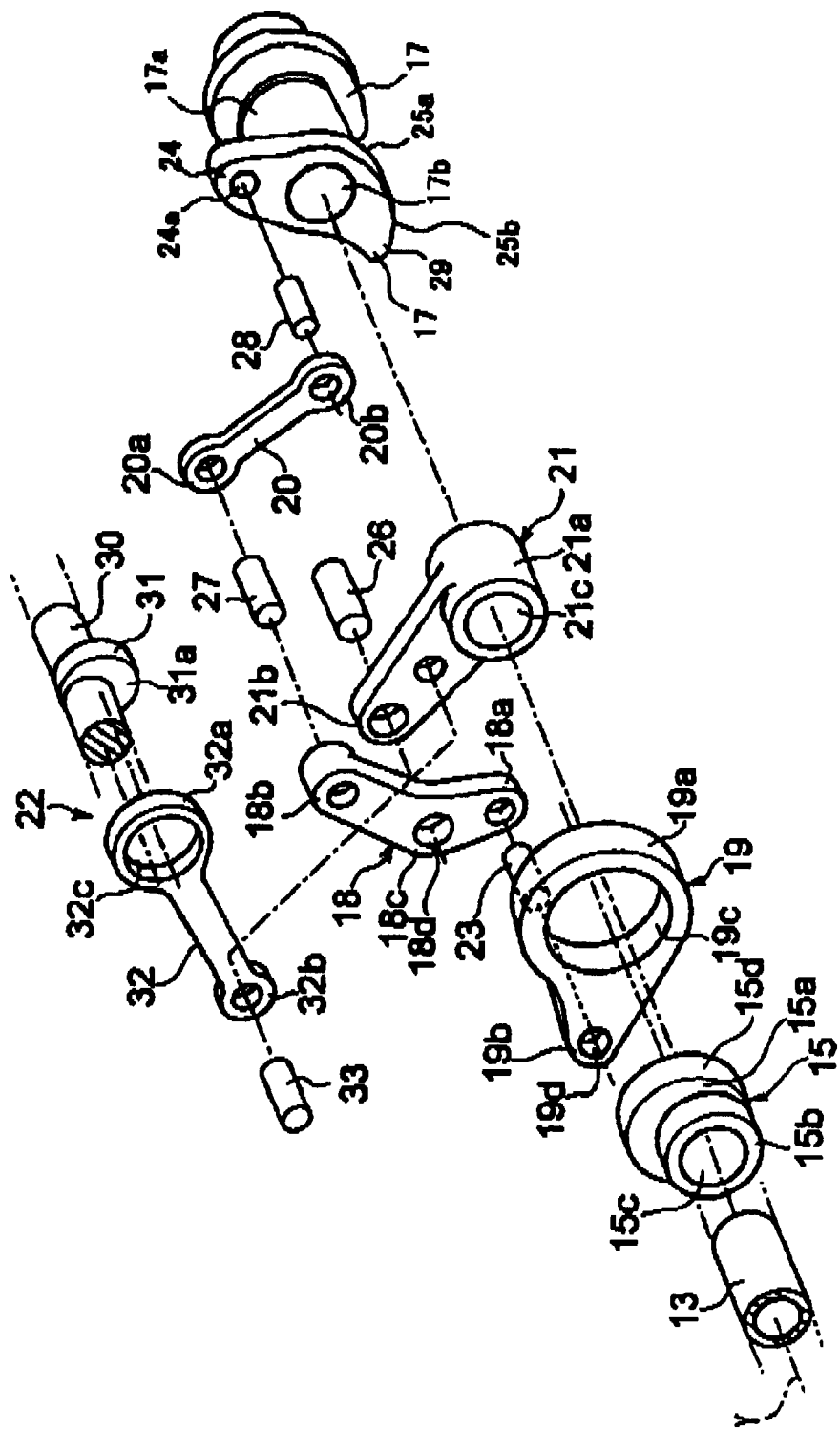
FIG. 4 is an exploded perspective view illustrating the variable operation angle mechanism according to the embodiment of the present invention.

As shown in FIG. 4, drive cam 15 comprises a cam main body 15a and a cylindrical portion 15b that is integrally provided on the outer end face of cam main body 15a. A shaft insertion hole 15c is formed in the internal axial direction of drive cam 15, and the central axis X of cam main body 15a is decentered by a predetermined amount from the central axis Y of intake camshaft 13.

Furthermore, drive cam 15 is press-fixed to intake camshaft 13 via shaft insertion hole 15c.

Link arm 19 is provided with a base section 19a and a protruding end 19b that is provided so as to protrude on the outer circumferential face of base section 19a. In the center position of base section 19a there is formed a fitting hole 19c that rotatably fits with the outer circumferential face of cam main body 15a of drive cam 15, and in protruding end 19b there is through-formed a pin hole 19d through which pin 23 for linking rocker arm 18 is rotatably inserted thereby.

Figure 3:
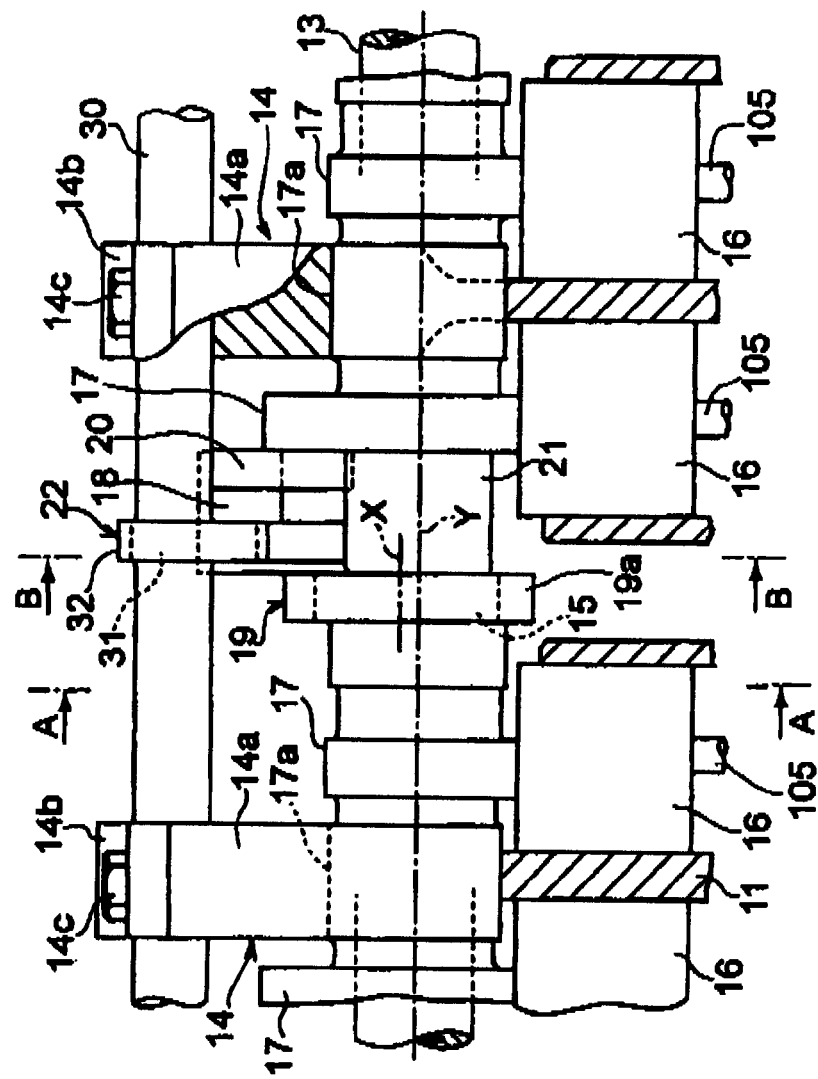
FIG. 3 is a side view illustrating the variable operation angle mechanism according to the embodiment of the present invention.

As shown in FIGS. 3 and 4, oscillating cams 17, 17 are disposed on both ends of a cylindrical base section 17a, in which there is through-formed a supporting hole 17b through which intake camshaft 13 is insert-fitted and rotatably supported.

In an end section 24 of one of oscillating cams 17, there is through-formed a pin hole 24a.

Moreover, on the under face of each of oscillating cams 17, 17, there are formed a base circular face 25a and a cam face 25b that extends in an arc shape from base circular face 25a towards an end section 29 side. Base circular face 25a and cam face 25b are to come In contact with predetermined positions on the top face of each of valve lifters 19 according to the oscillating position of oscillating cam 17.

A rotating direction of oscillating cams 17, 17 during a lift-rise from base circular face 25a to the end edge of cam face 25b is set to the direction same as a rotating direction of intake camshaft 13.

A bearing 14 includes a main bracket 14a that supports base section 17a positioned between oscillating cams 17, 17, and a sub bracket 14b that rotatably supports control shaft 30 described later, and both brackets 14a and 14b are fastened to be fixed together from above by a pair of bolts 14c, 14c.

As shown in FIG. 4, rocker arm 18 is arranged such that a central base section 18c is rotatably coupled to tip end section 21b of support arm 21 via a pin 26, one end section 18a is rotatably coupled to protruding end 19b of link arm 19 via pin 23, and the other end section 18b is rotatably coupled to one end section 20a of link member 20 via a pin 27.

As shown in FIG. 4, both end sections 20a and 20b of link member 20 are rotatably coupled to the other end section 18b of rocker arm 18 and end section 24 of oscillating cam 17, via pins 27 and 28, respectively.

Figure 2:
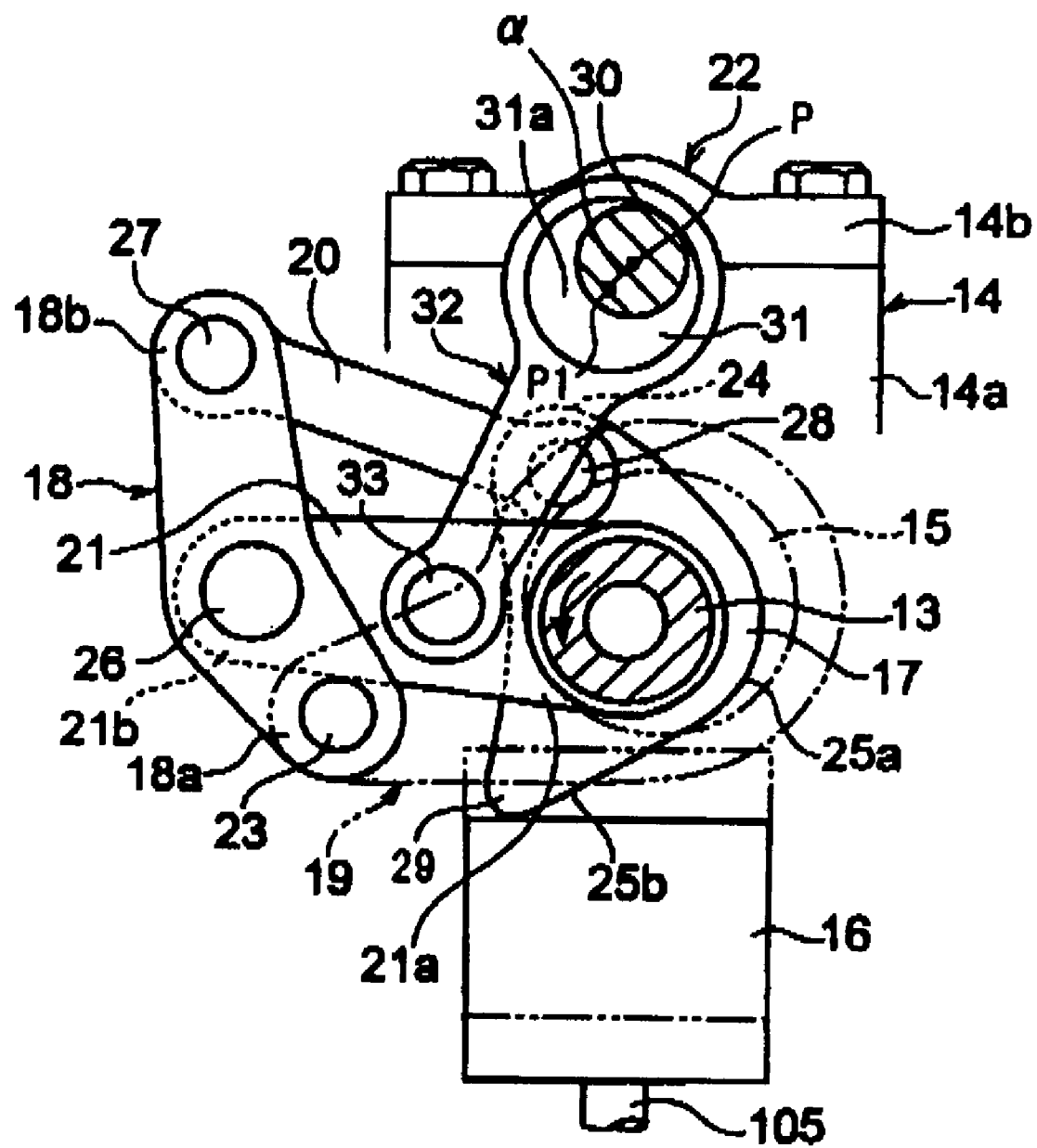
FIG. 2 is a cross sectional view illustrating a variable operation angle mechanism according to the embodiment of the present invention.

As shown in FIGS. 2 and 4, support arm 21 is arranged such that base end section 21a is rotatably supported on the outer circumferential face of intake camshaft 13 via shaft insertion hole 21c formed in base end section 21a, and tip end section 21b is coupled to pin hole 18d of base section 18c of rocker arm 18 via pin 26, as described above, to thereby serve as the swing support of rocker arm 18.

Moreover, support arm 21 is arranged in a manner that base end section 21a is held between drive cam 15 and oscillating cam 17.

Furthermore, support arm 21 is configured to rotate upward and downward by drive means 22, to thereby vary the valve lift amount of intake valves 105, 105, and is set so that when the valve lift amount is controlled to decrease, the rotating direction of the support arm 21 rotates upward in a direction opposite to the rotating direction of intake camshaft 13, as Indicated by an arrow in the figure.

Drive means 22 comprises control shaft 30 that is rotatably borne between main bracket 14a and sub bracket 14b of bearing 14, a control cam 31 that is integrally secured on the outer circumference of control shaft 30, a control link 32 by which control cam 31 and support arm 21 are linked to each other, and a not-shown actuator that rotation-drives control shaft 30.

As the actuator, an electric motor, for example, may be employed.

Each control cam 31 is secured on the outer circumference of control shaft 30, and as shown in FIG. 2, a central axis P1 of control cam 31 is shifted from a central axis P of control shaft 30 by α.

Moreover, control link 32 is configured that one end section 32a thereof is rotatably supported on the outer circumferential face of control cam 31 via a circular hole 32a, and the other end section 32b thereof is rotatably coupled to support arm 21 on a substantially center position in the longitudinal direction of support arm 21 via a pin 33.

A rotating range of control shaft 30 is limited by a stopper so that the stopper permits control shaft 30 to rotate within an angle range from an angle position corresponding to a minimum valve lift amount/minimum valve operation angle (default angle) to an angle position corresponding to a maximum valve lift amount/maximum valve operation angle. Control shaft 30 is rotation-driven within the rotating range by the actuator, which is operated in response to a control signal provided from ECM 114.

In the followings, the operation of VEL 112 having the above described structure will be described.

First, to increase the valve lift amount of intake valve 105, the angle position of control shaft 30 is controlled so that central axis P1 of control cam 31 is positioned on the lower left side of central axis P2 of control shaft 30 and a thick-walled part 31a approaches intake camshaft 13, as shown in FIG. 2.

At this time, support arm 21 downwardly rotates around base end section 21a and is maintained at a substantially horizontal position, as shown in the same figure.

Consequently, rocker arm 18 moves downward as a whole, and end section 24 of each oscillating cam 17 is forcibly pulled up slightly via link member 20, so that oscillating cam 17 rotates leftward (counterclockwise) as a whole, namely, in the direction same as the rotating direction of intake camshaft 13.

Figure 5:
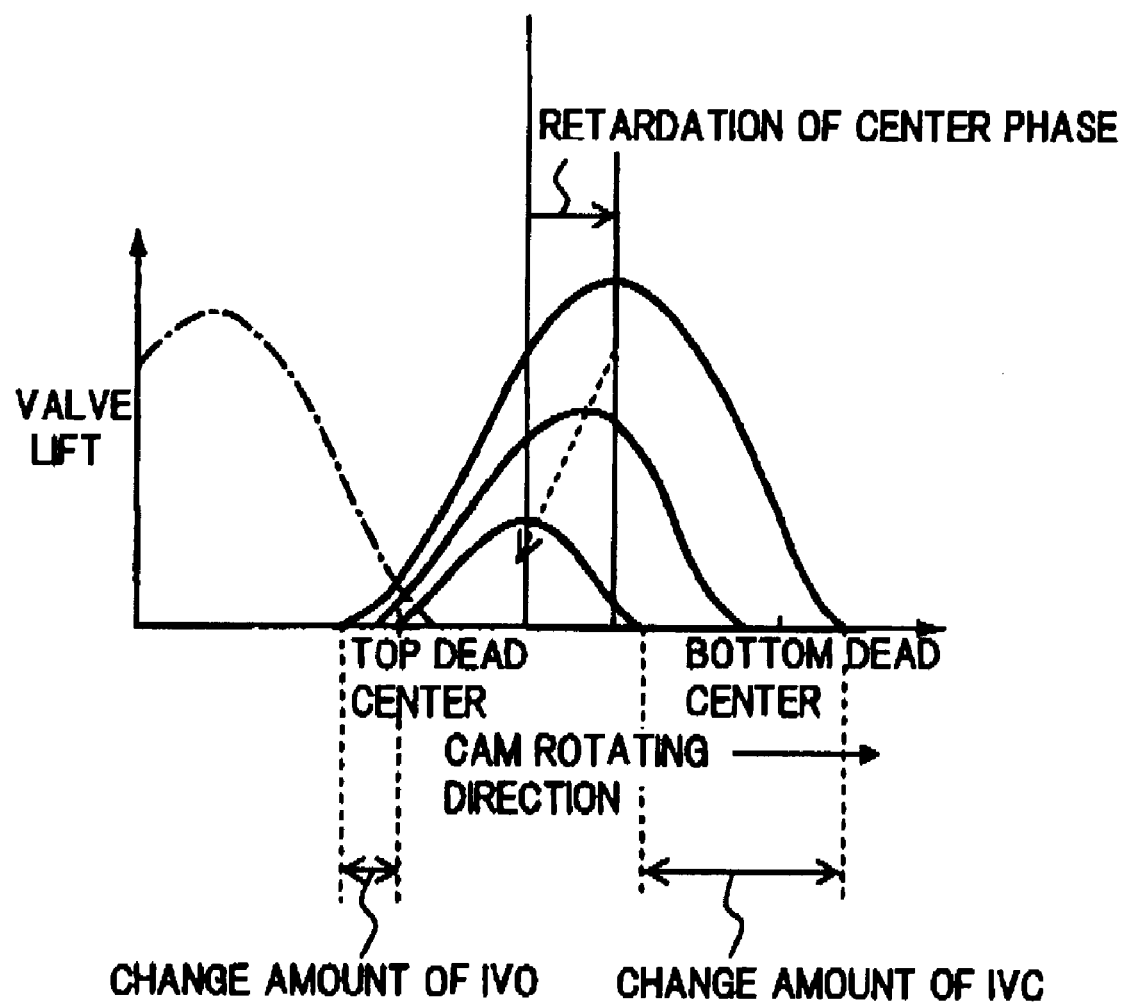
FIG. 5 is a graphical view illustrating variation characteristics of a valve operation angle and a valve lift amount of the variable operation angle mechanism according to the embodiment of the present invention.

As a result, a line connecting the center of oscillating cams 17, 17 with end section 29 rises up steeply, so that the valve lift amount and the valve operation angle are increased, and a phase of a center angle position of the valve operation angle relative to crankshaft 120 varies in the retard direction compared to the phase in which the valve lift amount and the valve operation angle are smaller, as shown in FIG. 5.

In contrast, to decrease the valve lift amount and the valve operation angle, control shaft 30 is rotation-driven so that control cam 31 is rotated clockwise by approximately 180° from the position indicated in FIG. 2 and central axis P1 (thick-walled part 31a) is moved upward.

At this time, support arm 21 upwardly rotates around base end section 21a and is maintained at a rotated position with a predetermined angle. Rocker arm 18 moves upward as a whole, and the other end section 18b of rocker arm 18 presses upper end section 24 of oscillating cam 17 in a rightward direction in the illustration of FIG. 2 via link member 20, so that oscillating cam 17 rotates clockwise by a predetermined degree as a whole, namely, in the direction opposite to the rotating direction of intake camshaft 13.

As a result, a gradient of the line connecting the center of oscillating cams 17, 17 with end section 29 becomes gentle, so that the valve lift amount and the valve operation angle are decreased, and the phase of the center angle position of the valve operation angle relative to crankshaft 120 varies in the advance direction compared to the phase in which the valve lift amount and the valve operation angle are larger, as shown in FIG. 5.

As mentioned above, in VEL 112, to increase the valve lift amount and the valve operation angle, support arm 21 is rotated from the upper rotated position to the horizontal rotated position as shown in FIG. 2. This rotating direction is the same as the rotating direction of intake camshaft 13 and the rotating direction of the lift-rise of oscillating cam 17. Accordingly, the center phase of the valve operation angle of intake valves 105, 105 is retarded as shown in FIG. 5.

On the other hand, to decrease the valve lift amount and the valve operation angle, support arm 21 is rotated upward by driving means 22, so that rocker arm 18 also moves upward. At this time, since drive cam 15 rotates in a direction opposite to this movement, a rocking timing of rocker arm 18 becomes earlier.

Consequently, the rotating movement of oscillating cam 17 in a lift-rising direction becomes earlier, and accordingly, the valve lift amount and valve operation angle are decreased and the center phase of the valve operation angle is advanced at the same time, as shown in FIG. 5.

ECM 114 receives a detection signal provided from angle sensor 133 that detects the rotating angle of control cam 30, and in order to rotate control shaft 30 to a target angle position corresponding to a target valve operation angle/target valve lift amount, ECM 133 feedback controls a manipulated variable of the actuator that rotates control shaft 30 based on the detection result of angle sensor 133.

Figure 6:
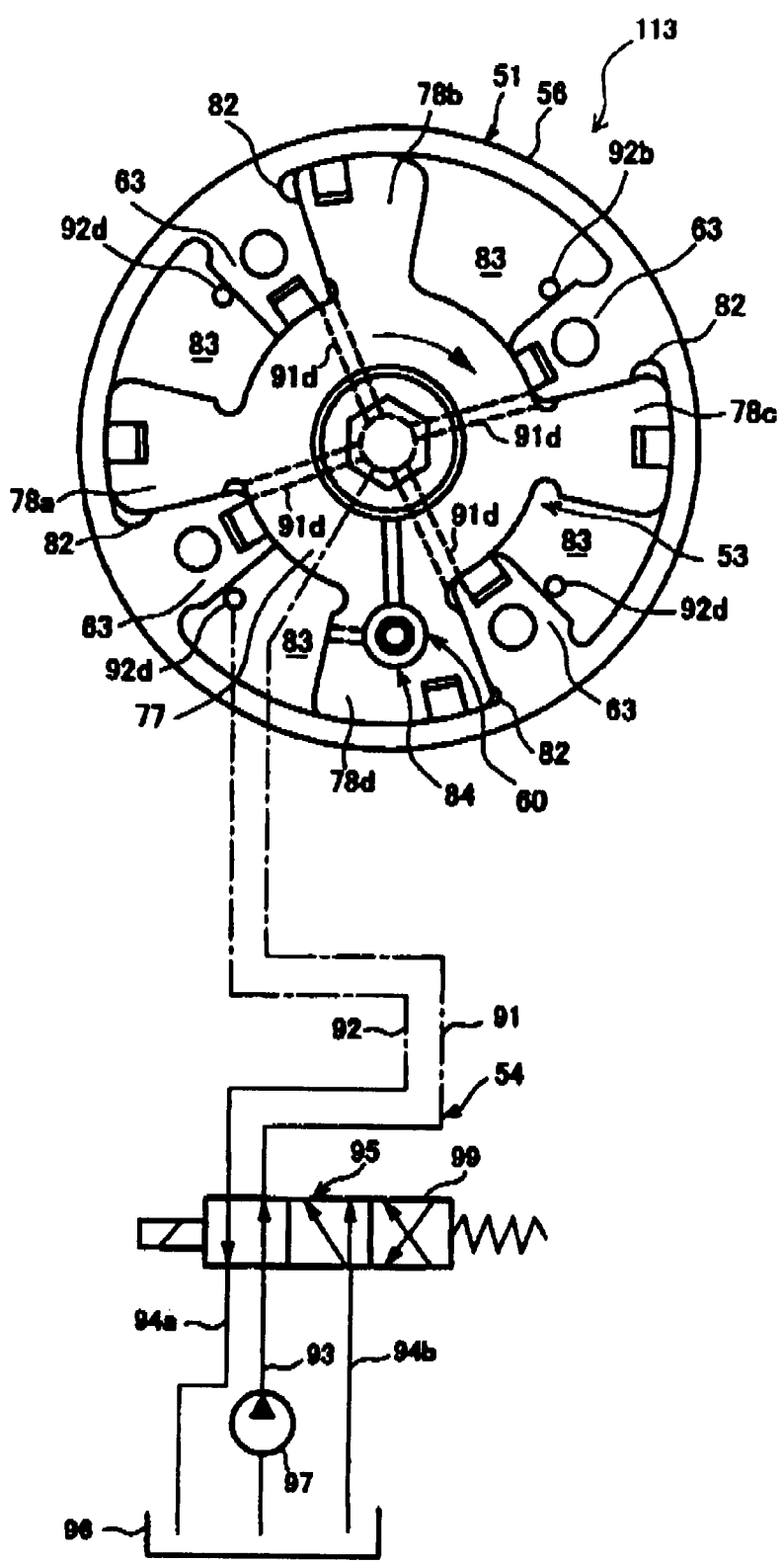
FIG. 6 is a cross sectional view illustrating a variable valve timing mechanism according to an embodiment of the present invention.

Next, the structure of VTC 113 will be described with reference to FIG. 6.

Although a vane-type variable valve timing mechanism is employed as VTC 113 in the present embodiment, VTC 113 is not limited to the vane-type mechanism, and various known mechanisms, such as an electric mechanism and a mechanism using an electromagnetic retarder, may be adopted.

Vane-type VTC 113 is provided with a cam sprocket 51 that is rotation-driven by crank shaft 120 via a timing chain, a rotation member 53 that is fixed on the end section of intake camshaft 13 and rotatably housed within cam sprocket 51, a hydraulic circuit 54 that relatively rotates rotation member 53 with respect to cam sprocket 51, and a locking mechanism 60 that selectively locks the relative rotational position between cam sprocket 51 and rotation member 53 in a predetermined position.

Cam sprocket 51 comprises: a rotating section (not shown in the figure) having a teeth section on the outer circumference thereof, with which the timing chain meshes; a housing 56 that is disposed in front of the rotating section so as to rotatably house rotation member 53; and a front cover and a rear cover (not shown in the figure) that block front/rear openings of housing 56.

Housing 56 is of a cylindrical shape, with both of the front/rear ends formed open ended, and on the inner circumferential face of housing 56 there are provided four protruding partition wall sections 63 in sectionally trapezoid shape along the circumferential direction of housing 56 at equal intervals of 90°.

Rotation member 53 is fixed on the front end section of intake camshaft 13, and on the outer circumferential face of a toric shaped base section 77, there are provided four vanes 78a, 78b, 78c, 78d at equal intervals of 90°.

First to fourth vanes 78a to 78d are respectively of substantially sectionally inverse trapezoid shape and are disposed in cavity sections between respective partition wall sections 63, and they partition these cavity sections in front and rear thereof in the rotating direction. Thereby, between both sides of vanes 78a to 78d and both end faces of the respective partition wall sections 63, there are formed an advance angle side hydraulic chamber 82 and a retard angle side hydraulic chamber 83.

Locking mechanism 60 is configured such that a lock pin 84 is insert-fitted into an engaging hole (not shown in the figure) in a rotating position on the maximum retard angle side of rotation member 53 (in a default position).

Hydraulic circuit 54 has two systems of oil pressure passages, namely a first oil pressure passage 91 that supplies and discharges oil pressure to advance angle side hydraulic chamber 82 and a second oil pressure passage 92 that supplies and discharges oil pressure to retard angle side hydraulic chamber 83, and to both of these oil pressure passages 91 and 92, there are connected a supply passage 93 and drain passages 94a and 94b respectively via an electromagnetic switching valve 95 for switching the passages.

In supply passage 93, there is provided an engine-driven oil pump 97 that pressure feeds the oil inside an oil pan 96, while the downstream side ends of drain passages 94a and 94b are communicated with oil pan 96.

First oil pressure passage 91 is connected to four branched passages 91d that are formed in a substantially radial pattern in base section 77 of rotation member 53 so as to communicate with the respective advance angle side hydraulic chambers 82, and second oil pressure passage 92 is connected to four oil holes 92d that open to respective retard angle side hydraulic chambers 83.

Electromagnetic switching valve 95 is configured such that a spool valve therein carries out relative switching control between respective oil pressure passages 91 and 92, supply passage 93 and drain passages 94a and 94b.

ECM 114 controls a current flow amount to an electromagnetic actuator 99 that drives electromagnetic switching valve 95, based on a duty control signal.

For example, when a control signal of a duty ratio of 0% (OFF signal) is output to electromagnetic actuator 99, the operating oil that has been pressure-fed from oil pump 97 travels through second oil pressure passage 92 to be supplied into retard angle side hydraulic chamber 83, and the operating oil within advance angle side hydraulic chamber 82 travels through first oil pressure passage 91 to be discharged from first drain passage 94a into oil pan 96.

Consequently, the internal pressure of retard angle side hydraulic chamber 83 becomes high and the internal pressure of advance angle side hydraulic chamber 82 becomes low, and rotation member 53 rotates towards the retard angle side via vanes 78a to 78d. As a result, the phase of the opening timing of intake valve 105 relative to crankshaft 120 is retarded.

On the other hand, when a control signal of a duty ratio of 100% (ON signal) is output to electromagnetic actuator 99, the operating oil travels through first oil pressure passage 91 so as to be supplied into advance angle side hydraulic chamber 82, and the operating oil within retard angle side hydraulic chamber 83 travels through second oil pressure passage 92 and second drain passage 94b so as to be discharged into oil pan 96, thereby reducing the pressure of retard angle side hydraulic chamber 83.

Therefore, rotation member 53 rotates towards the advance angle side via vanes 78a to 78d, thereby advancing the phase of the opening timing of intake valve 105 relative to crankshaft 120.

Thus, within a range where vanes 78a to 78d can relatively rotate in housing 56, the phase of intake camshaft 13 relative to crankshaft 120 continuously shifts between the most retard position and the most advance position, and the phase of the opening timing of intake valve 105 continuously shifts.

In the followings, the control operation of VEL 112 and VTC 113 carried out by ECM 114 will be described in detail, with reference to the flowchart shown in FIG. 7.

Figure 7:
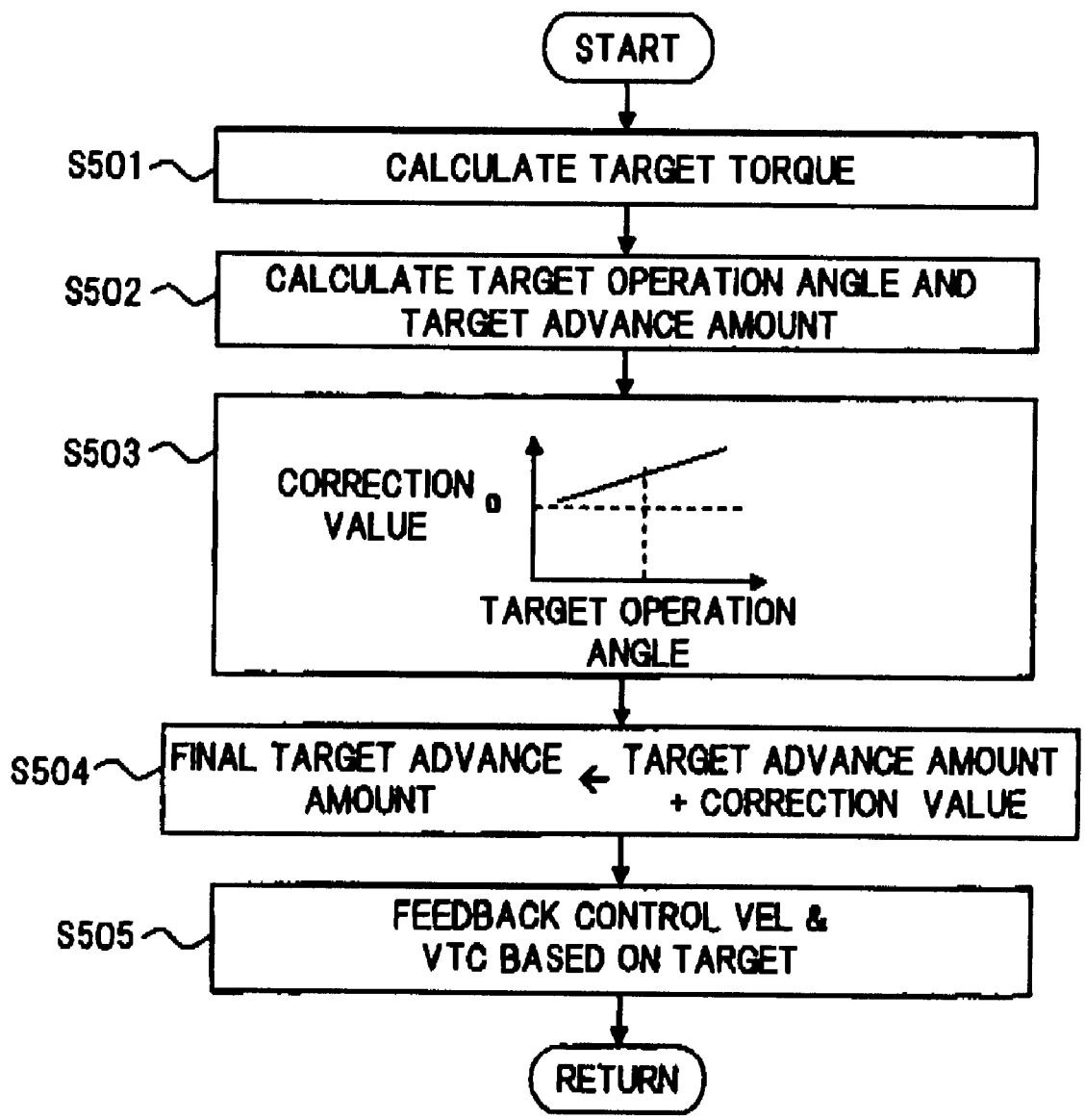
FIG. 7 is a flowchart illustrating a correction control of a target value of the variable valve timing mechanism according to the embodiment of the present invention.

A routine indicated in the flowchart of FIG. 7 is executed at every given fixed cycle (e.g., 10 microseconds each).

In step S501, a target torque is calculated based on both accelerator opening degree ACC detected by accelerator pedal sensor 116 and engine rotating speed NE calculated based on the signal from crank angle sensor 117.

Figure 8:
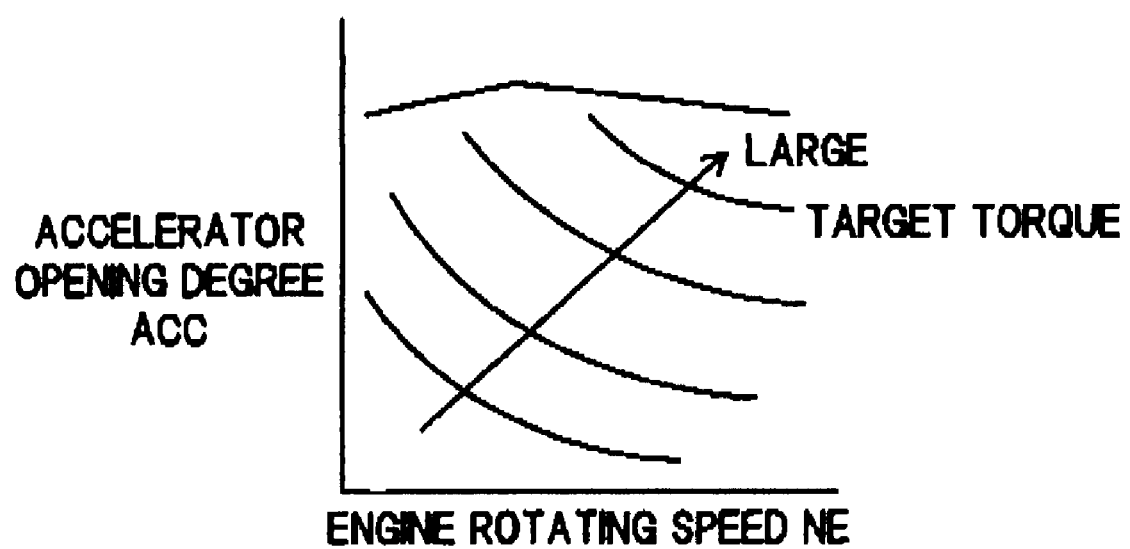
FIG. 8 is a graphical view illustrating a correlation between an accelerator opening degree ACC, an engine rotating speed NE, and a target torque according to the embodiment of the present invention.

As shown in FIG. 8, the target torque is calculated by making reference to a previously-provided map, in which there is previously stored the target torque employing accelerator opening degree ACC and engine rotating speed NE as variables.

Here, the target torque is set so that the larger accelerator opening degree ACC is or the greater engine rotating speed NE is, the larger target torque is calculated.

In the next step S502, each of a target value of the valve operation angle (target operation angle) that Is varied by VEL 112 and a target advance amount in VTC 113 is calculated from the target torque and engine rotating speed NE.

Here, the target advance amount is expressed as an advance angle from the most retard position which is a reference position (default position), and the target operation angle is calculated as a rotating angle from a reference angle (default angle) of control shaft 30 that corresponds to the minimum valve operation angle.

Figure 9:
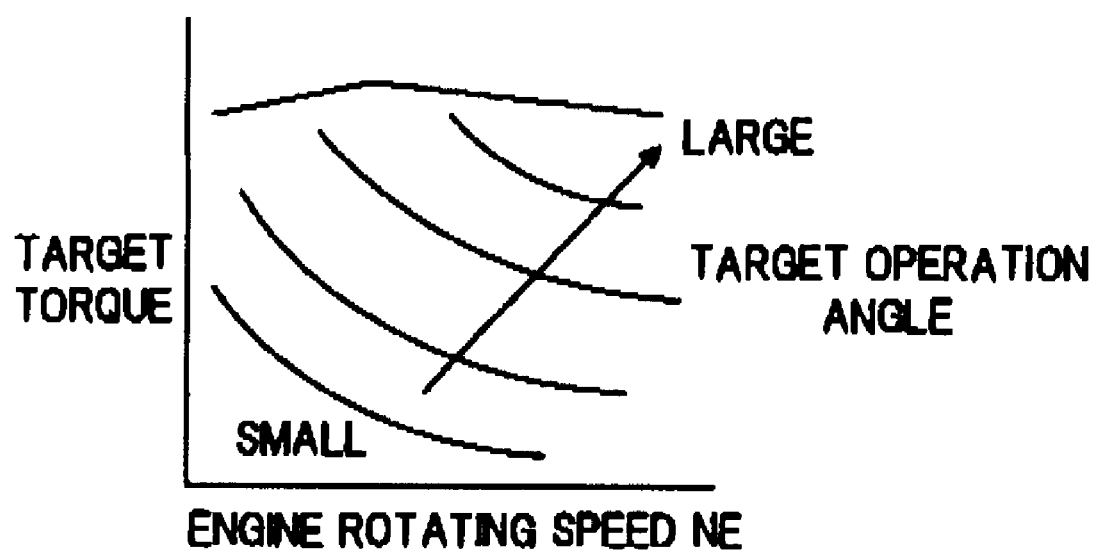
FIG. 9 is a graphical view illustrating a correlation between the target torque, the engine rotating speed NE, and a target value of the variable operation angle mechanism according to the embodiment of the present invention.

As shown in FIG. 9, the target operation angle is calculated by making reference to a previously-provided map, in which there is previously stored the target operation angle employing the target torque and engine rotating speed NE as variables. Here, the larger the target torque is or the greater engine rotating speed NE is, the larger target operation angle is calculated.

Figure 10:
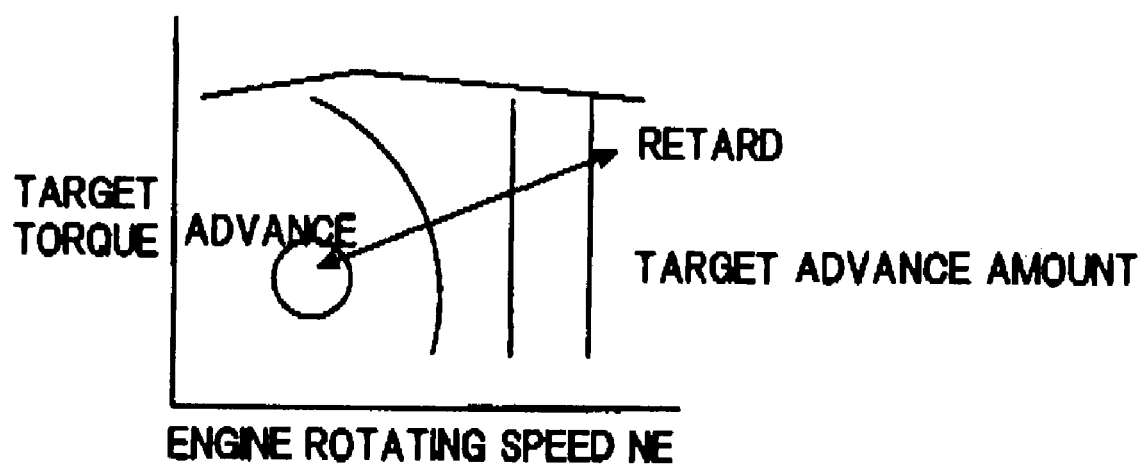
FIG. 10 is a graphical view illustrating a correlation between the target torque, the engine rotating speed NE, and the target value of the variable valve timing mechanism according to the embodiment of the present invention.

Moreover, as shown in FIG. 10, the target advance amount is calculated by making reference to a previously-provided map, in which there is previously stored the target advance amount employing the target torque and engine rotating speed NE as variables. Here, as shown in FIG. 10, in a region where the engine rotation is low, the target advance amount is set to the most advanced value in a reference operation region which is near the center of the low rotation region, and as separating from the reference operation region, the target advance amount is more retarded. Furthermore, in the high rotation region, the target advance amount is set to a value in a more retard angle side than that in the low rotation region, and as engine rotating speed NE gets higher, the target advance amount is retarded.

The target operation angle and target advance amount, however, may be set based on any engine operating state, and not limited to the configuration in which the target operation angle and target advance amount are set based on the target torque and engine rotating speed NE.

The target advance amount is calculated as a target of the center phase of the valve operation angle of intake valve 105.

However, VEL 112 employed in the present embodiment is a mechanism in which the center phase of the valve operation angle varies in response to an increase/decrease in the valve operation angle, as described above. Accordingly, even if VTC 113 is controlled to the most retard position an actual center phase will differ from the target center phase depending on the valve operation angle at that time, for example.

Thus, in the next step S503, a correction value for correcting the target advance amount based on a change amount of the center phase caused by the variation in the valve operation angle varied by VEL 112.

Specifically, there is previously provided a table in which the correction value according to the target operation angle is stored, and in step S503, the correction value corresponding to the target operation angle at that time is retrieved from the table.

Here, as shown in FIG. 5, in VEL 112 of the present embodiment, the center phase is changed to be advanced in response to the decrease of the valve operation angle, whereas the center phase is changed to be retarded in response to the increase in the valve operation angle. Accordingly, when using a center phase of the minimum valve operation angle as a basis, the center phase is retarded as the valve operation angle increases.

Figure 11:
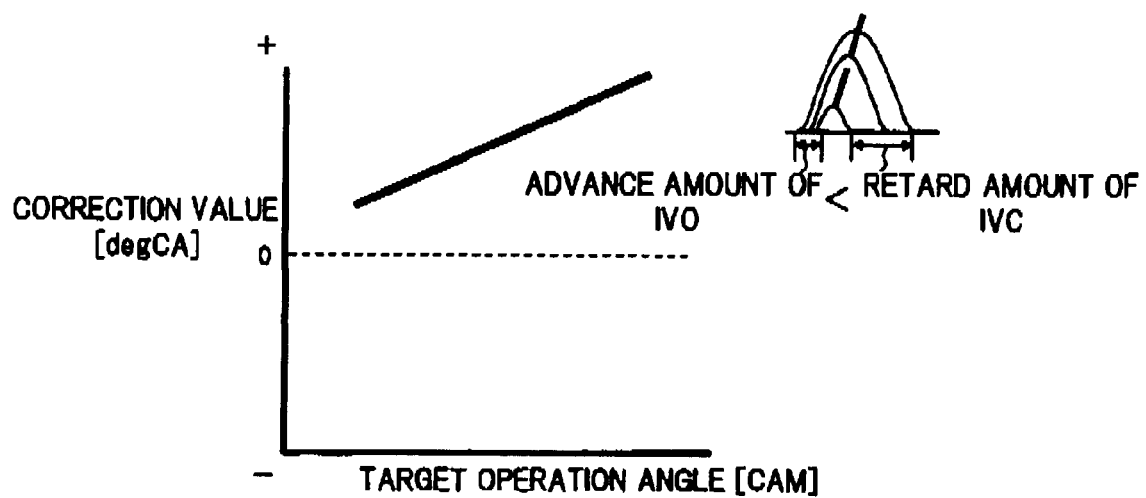
FIG. 11 is a graphical view illustrating a correlation between the target value of the variable operation angle mechanism and a correction value for correcting the target value of the variable valve timing mechanism according to the embodiment of the present invention.

Thus, in order to cancel out the retarding change of a center phase due to the increase in the valve operation angle so as to conform the center phase of the increased valve operation angle to a center phase of the minimum operation angle, the correction value is set, as shown in FIG. 11, to a value that: is a positive number, an absolute value of which increases as the target operation angle increases; and corrects the target advance amount in the advance direction to a greater degree as the target operation angle increases.

In step S504, the target advance amount set in step S502 is added with the correction value set in step S503, thereby obtaining a final target advance amount.

By controlling VTC 113 based on the final target advance amount corrected with the correction value, even if the target valve operation angle differs, the center phase at that time can be controlled to a center phase required from the target torque and engine rotating speed NE at that time.

In step S505, a manipulated variable of VEL 112 is feedback controlled based on the target operation angle set in step S502, and a manipulated variable of VTC 113 is feedback controlled based on the final target advance amount corrected in step S504.

For these feedback controls, various control techniques, such as a PID control that sets a proportional manipulated variable, an integral manipulated variable and a derivative manipulated variable, a reference model control, a sliding mode control, and the like, may be used based on a difference between a control amount detected by a sensor and a target value.

Figure 12:
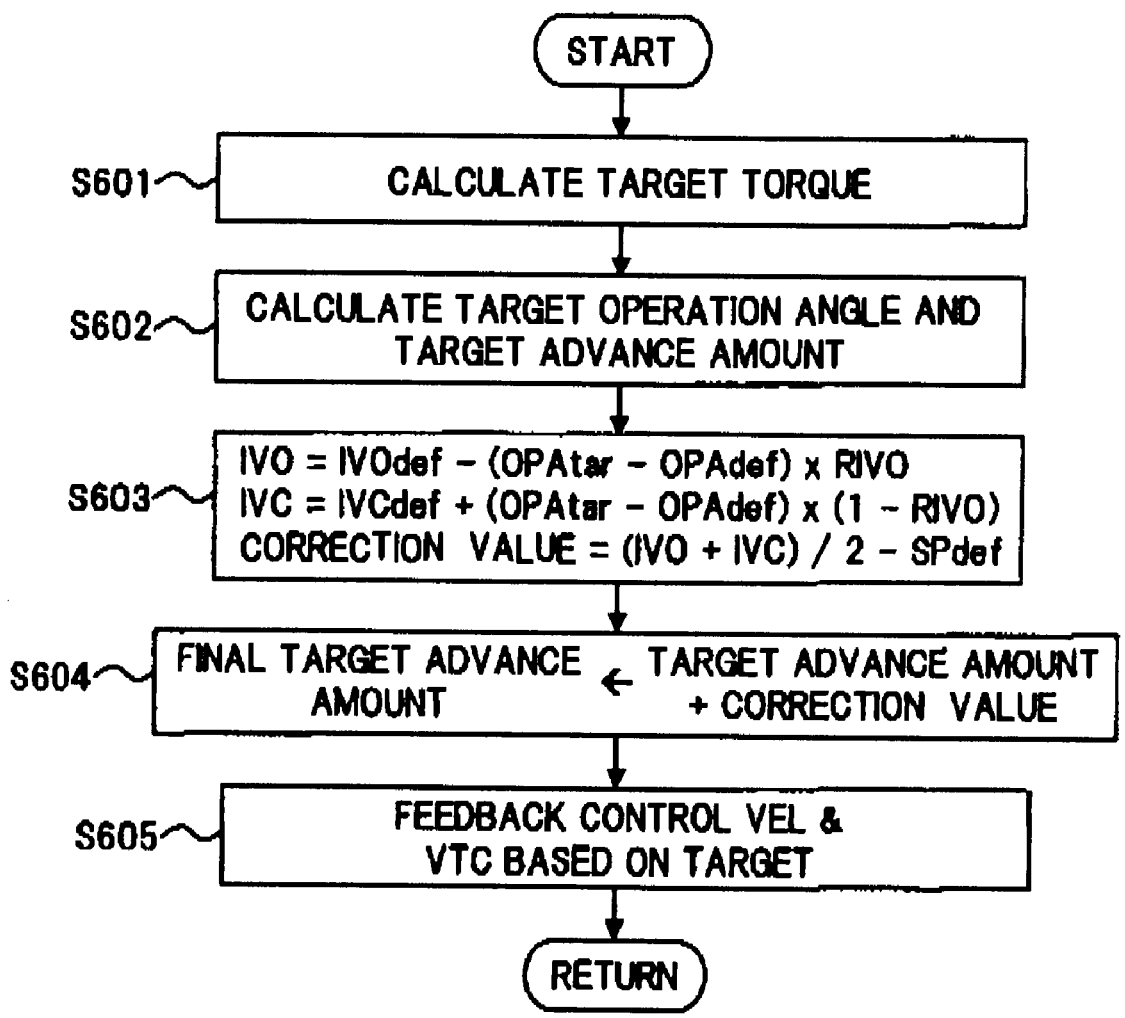
FIG. 12 is a flowchart illustrating the correction control of the target value of the variable valve timing mechanism according to the embodiment of the present invention.

In the above-mentioned control indicated in the flowchart shown in FIG. 7, the correction value for correcting the target advance amount is obtained by retrieving from the table based on the target operation angle, however, the correction value may be set by calculating the change amount of the center phase due to the varied valve operation angle from the target operation angle at that time. In the followings, a correction control according this configuration will be described with reference to the flowchart shown in FIG. 12.

In steps S601 and S602, a target torque, a target operation angle, and a target advance amount are calculated as with the above steps S501 and S502.

In step S603, a difference between a central phase at the target operation angle at that time and a central phase at a reference operation angle (minimum operation angle), and based on the obtained difference, the correction value is set.

Specifically, an opening timing IVO and a closing timing IVC of intake valve 105 in the target operation angle at that time and In the case where VTC 113 is controlled to a reference advance amount, is calculated in accordance with the following equation:

$$IVO=IVOdef-(OPAtar-OPAdef) \times RIVO$$

$$IVC=IVCdef+(OPAtar-OPAdef) \times (1-RIVO)$$

Here, the opening/closing timings of intake valve 105 are expressed as a retard angle from the top dead center.

In the above equation, OPAtar is a target operation angle, and OPAdef is an operation angle in a default state of VEL 112 (reference operation angle), e.g., a minimum operation angle.

IVOdef is an opening timing IVO in the default state of VEL 112 and VTC 113, namely, in the minimum operation angle and the most retard position, and IVCdef is a closing timing IVC in the default state of VEL 112 and VTC 113, namely, in the minimum operation angle and the most retard position. These IVOdef and IVCdef are previously stored.

Furthermore, RIVO represents a ratio of a change angle of opening timing IVO to a change amount of the valve operation angle operated by VEL 112, and RIVC represents a ratio of a change angle of closing timing IVC to a change amount of the valve operation angle operated by VEL 112.

Here, RIVO+RIVC=100%.

For example, in the case where the center phase of valve operation angle does not vary even the valve operation angle is varied by VEL 112, opening timing IVO is advanced for a half of increased angle of the valve operation angle, and closing timing IVC is retarded for the other half of increased angle, and similarly, opening timing IVO is retarded for a half of decreased angle of the valve operation angle, and closing timing IVC is advanced for the other half of decreased angle.

Thus, in the case where the center phase of valve operation angle does not vary even the valve operation angle is varied because opening timing IVO varies for a half of the change angle of the valve operation angle and closing timing IVC varies for the other half of the change angle of the valve operation angle, ratio RIVO and ratio RIVC become 50%.

On the other hand, as in VEL 112 of the present embodiment, in the case of such a mechanism that the center phase is simultaneously varied by varying the valve operation angle, when the center phase is retarded in response to the increase in valve operation angle as shown in FIG. 5, an angle change amount of closing timing IVC with respect to the change in the valve operation angle becomes larger than an angle change amount of opening timing IVO, and accordingly, ratio RIVO becomes less then 50%.

In other words, in the case where opening timing IVO varies for an angle less than half of the change amount of the valve operation angle and closing timing IVC varies for an angle more than half of the change amount of the valve operation angle, the center phase is retarded in response to the increase in the valve operation angle, and thus, ratio RIVO at that time becomes 0%≦RIVO≦50%.

Furthermore, ratio RIVO of 0% indicates a characteristic that opening timing IVO is constant (i.e., does not very) while the valve operation angle is varied, and the valve operation angle varies by varying closing timing IVC.

For example, when opening timing IVO is advanced for an angle corresponding to 30% of the increased amount of valve operation angle and closing timing IVC is retarded for an angle corresponding to 70% of the same, ratio RIVO is 30% and ratio RIVC is 70%.

Because ratios RIVO and RIVC are fixed values which is determined depending on the structure/specification of VEL 112, ratio RIVO and/or ratio RIVC is previously stored.

Moreover, "OPAtar–OPAdef" is an increased amount of the target operation angle with respect to the minimum operation angle, and "(OPAtar–OPAdef)×RIVO" is a change angle of opening timing IVO corresponding to the increased amount. Still further, since "1–RIVO" is equal to RIVC, "(OPAtar–OPAdef)×(1–RIVO)" indicates a change angle of closing timing IVC corresponding to the increased amount of the target operation angle with respect to the minimum operation angle.

Here, IVOdef is opening timing IVO in the default state, and IVCdef is closing timing IVC in the default state. In VEL 112 of the present embodiments, the center phase is retarded in response to the increase in valve operation angle.

Accordingly, "IVOdef–(OPAtar–OPAdef)×RIVO" indicates opening timing IVO that is advanced by varying the valve operation angle from the minimum value to the target value in the state where VTC 113 is fixed to the most retard angle side. Further, "IVC def+(OPAtar–OPAdef)×(1–RIVO)" indicates closing timing IVC that is retarded by varying the valve operation angle from the minimum value to the target value In the state where VTC 113 is fixed to the most retard angle side.

After obtaining opening timing IVO and closing timing IVC at the target operation angle, as indicated above, the correction value for correcting the target advance amount is calculated in accordance with the following equation:

$$\text{Correction value}=(IVO+IVC)/2-SPdef$$

In this equation, "(IVO+IVC)/2" indicates an angle from the top dead center to the center phase at the target operation angle. Similarly, SPdef indicates an angle from the top dead center to the center phase in the default state of VEL 112 and VTC 113.

Accordingly, the above "(IVO+IVC)/2–SPdef" indicates the retard change of the center phase due to the increase in the valve operation angle from the minimum value to the target value.

Thus, by correcting the target advance amount to be increased by the correction value, a center phase can be controlled to the target center phase.

After calculating the correction value, as indicated above, in the next step S604 the target advance amount obtained in step S602 is corrected by the correction value, thereby obtaining a final target advance amount.

Then, in the next step S605, VEL 112 is feedback controlled based on the target operation angle that is set in step S602, and VTC 113 is feedback controlled based on the final target advance amount corrected in step S604.

In the followings, calculation of the correction value in step S603 will be described in more specific, with reference to FIG. 13.

Figure 13:
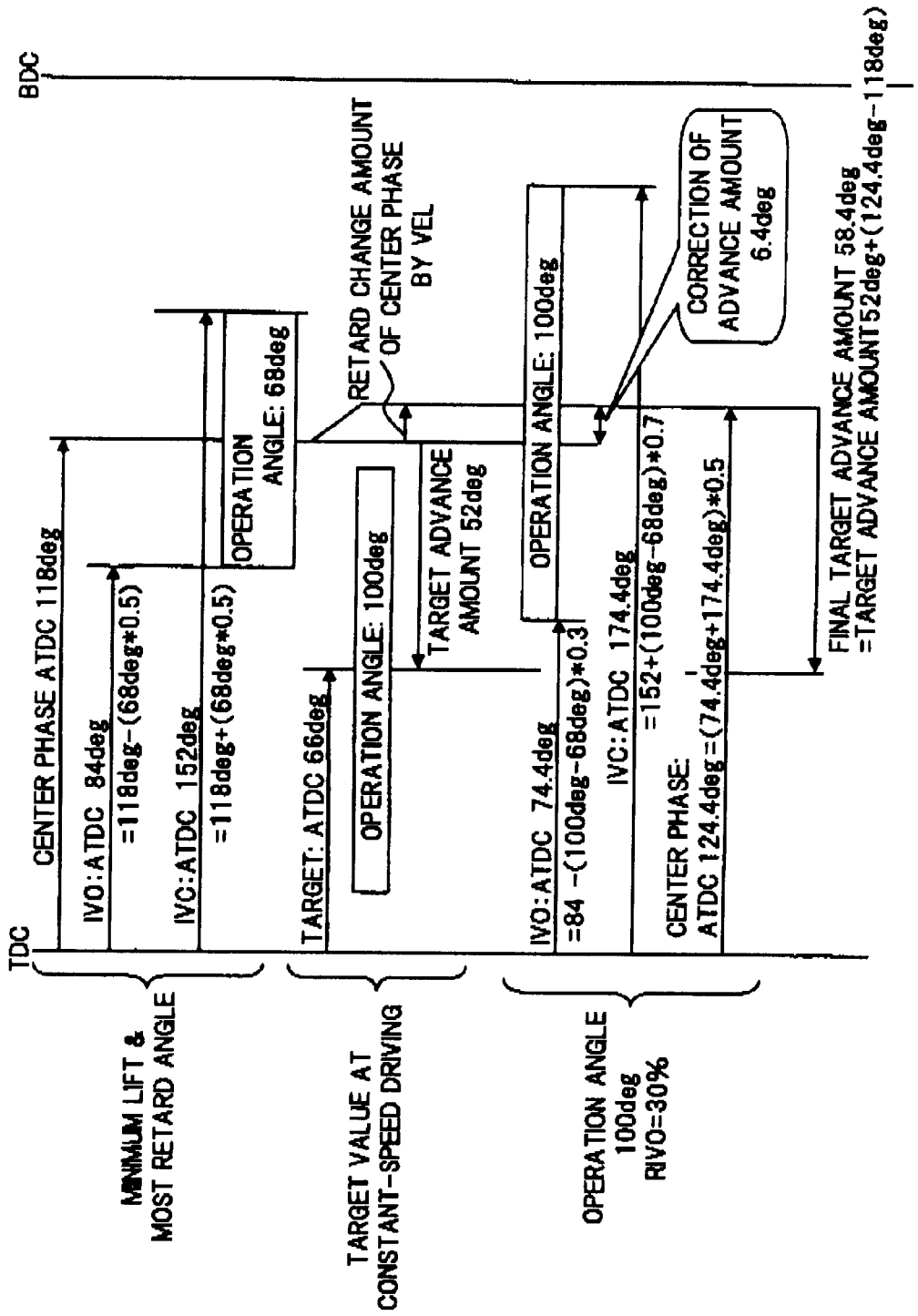
FIG. 13 is a diagrammatic view for explaining a control for shifting open characteristics of an intake valve from a default state to a target at an intermediate-load operation according to the embodiment of the present invention.

FIG. 13 shows the case where the open characteristics of intake valve 105 is changed from that in the default state to the valve characteristics at an intermediate-load operation.

As used herein, the intermediate-load operation means a constant-speed operating state at vehicle speed of approximately 40 km/h and an operating state in which low-fuel consumption is required.

The default state of VEL 112 is a state having the minimum operation angle as described above, and the default state of VTC 113 is a state having the most retard angle, and accordingly, the center phase at the minimum operation angle/the most retard angle, and opening timing IVO and closing timing IVC at the minimum operation angle/the most retard angle position are previously stored.

Here, in the default state, the valve operation angle is set to 68 deg, opening timing IVO is set to 84 degree ATDC (after top-dead-center) (hereinafter, referred to as "deg ATDC"), closing timing IVC is set to 152 deg ATDC, and the center phase is set to 118 deg ATDC.

Then, for the intermediate-load operation time, the target advance amount is set to 52 deg, and the target operation angle is set to 100 deg. Herein, as an example, the case where the center phase of 66 deg ATDC at the valve operation angle of 100 deg is achieved will be described.

If VEL 112 is a mechanism that can vary the valve operation angle without varying the center phase, the center phase does not varies even when only the valve operation angle is varied, and thus, by controlling VTC 113 based on the target advance amount, the target center phase can be obtained.

However, as in the present embodiment, in VEL 112 that varies the center phase to be retarded in response to the increase in the valve operation angle, the center phase might include a difference from the target angle for the change amount of the center phase operated by VEL 112 unless the target advance amount is corrected for the change amount of the center phase operated by VEL 112. Thus, the correction value is calculated from the following equation:

$$IVO = IVOdef - (OPAtar - OPAdef) \times RIVO$$

$$IVC = IVCdef + (OPAtar - OPAdef) \times (1 - RIVO)$$

$$\text{Correction value} = (IVO + IVC)/2 - SPdef$$

In the example of FIG. 13, opening timing IVO, closing timing IVC, correction value can be calculated as follows. Here, the ratio RIVO is set to be 30%.

$$IVO = 84 \text{ deg} - (100 \text{ deg} - 68 \text{ deg}) \times 30\%$$
$$= 74.4 \text{ deg}$$

$$IVC = 152 \text{ deg} + (100 \text{ deg} - 68 \text{ deg}) \times (100\% - 30\%)$$
$$= 174.4 \text{ deg}$$

$$\text{Correction value} = (74.4 \text{ deg} + 174.4 \text{ deg})/2 - 118 \text{ deg}$$
$$= 6.4 \text{ deg}$$

The above "(74.4 deg+174.4 deg)/2", from which the correction value can be calculated, indicates the center phase that varies due to the increase in the valve operation angle from the minimum 68 deg to 100 deg while maintaining VTC 113 to be in the most retard state, and the correction value at that time indicates the retard change amount of the center phase of when the operation angle is varied from 68 deg (i.e., the minimum value) to 100 deg by VEL 112.

On the other hand, the target advance amount of 52 deg is such a target value that it is set by assuming that the center phase does not vary even the valve operation angle varies. Thus, if the center phase is retarded for 6.4 deg by setting the target operation angle to 100 deg, the starting point of advancing operation is position to be more retarded, and accordingly, it becomes necessary to set the target advance amount to a value on the advanced side for extra 6.4 deg in addition to 52 deg.

Consequently, by setting the target advance amount as the sum of 52 deg and 6.4 deg, 66 deg ATDC, which is the target center phase, can be achieved.

Figure 14:
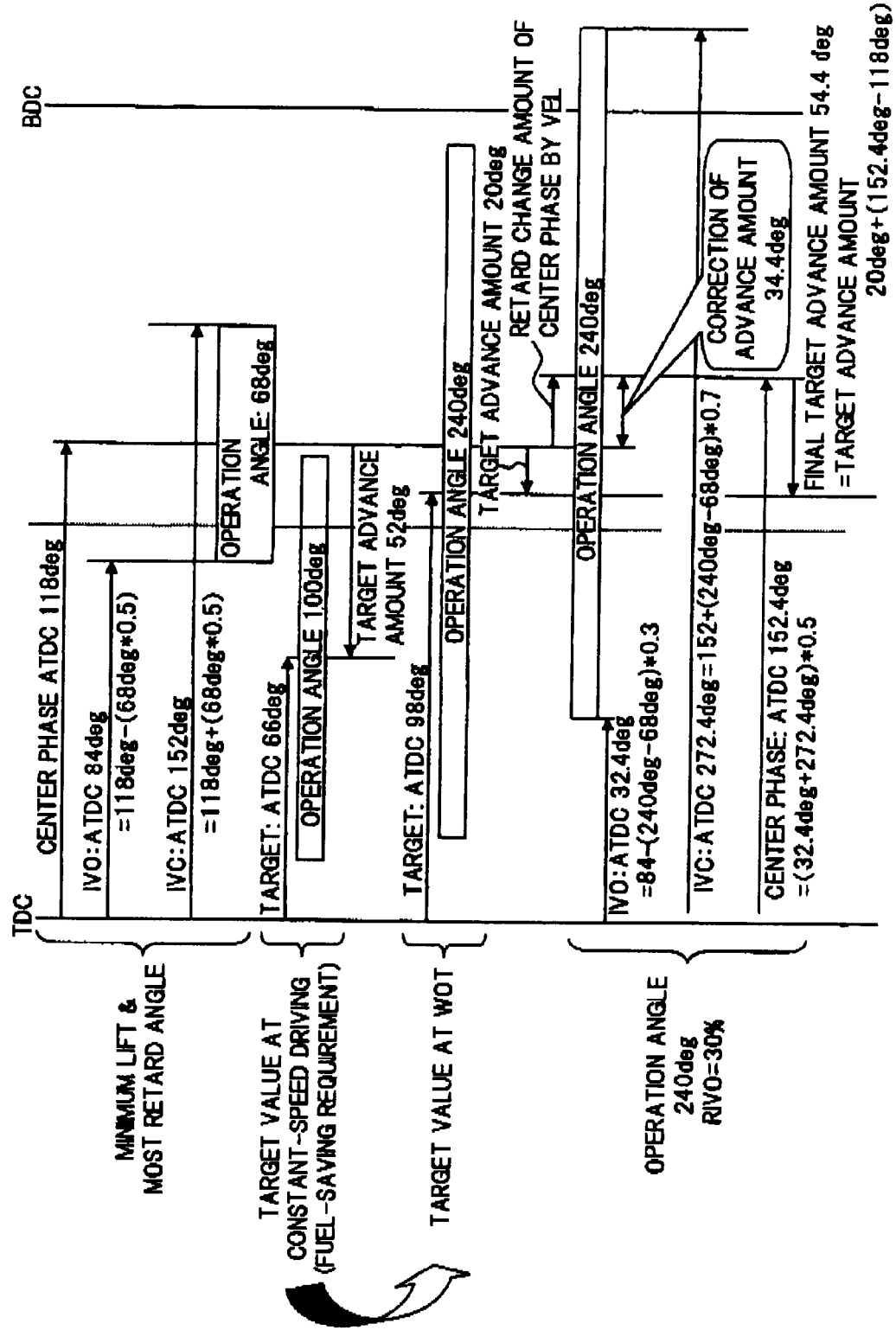
FIG. 14 is a diagrammatic view for explaining a control for shifting the open characteristics of the intake valve from the target at the intermediate-load operation to a target at a full throttle operation according to the embodiment of the present invention.

FIG. 14 shows the change of open characteristics of intake valve 105 of when the operating state is changed from the intermediate-load operation in which the target operation angle is set to 100 deg and the target center phase is set to 66 deg ATDC to the operating state where the accelerator pedal is fully operated.

Here, since the accelerator pedal is fully operated, the target center phase is changed from 066 deg ATDC to 98 deg ATDC. In accordance with this change, the target advance amount of VTC 113 is changed from 52 deg to 20 deg, and the target operation angle at the state where the accelerator pedal is fully operated (WOT) is set to 240 deg.

Under these conditions, opening timing IVO, closing timing IVC, correction value can be calculated as follows.

$$IVO = 84 \text{ deg} - (240 \text{ deg} - 68 \text{ deg}) \times 30\%$$
$$= 32.4 \text{ deg}$$

$$IVC = 152 \text{ deg} + (240 \text{ deg} - 68 \text{ deg}) \times (100\% - 30\%)$$
$$= 272.4 \text{ deg}$$

$$\text{Correction value} = (32.4 \text{ deg} + 272.4 \text{ deg})/2 - 118 \text{ deg}$$
$$= 34.4 \text{ deg}$$

Thus, in the case where the operating state is changed from the state where the target operation angle is 100 deg and the target center phase is 66 deg ATDC to the state where the accelerator pedal is fully operated, the target center phase can be achieved by correcting the target advance amount of 20 deg to 54.4 deg.

Thus, even if the target advance amount, which is set relative to the target torque and the engine rotating speed, is set as an advance amount from the center phase at the default state, the center phase can be controlled to achieve the target center phase with high precision by using the correction value.

Figure 15:
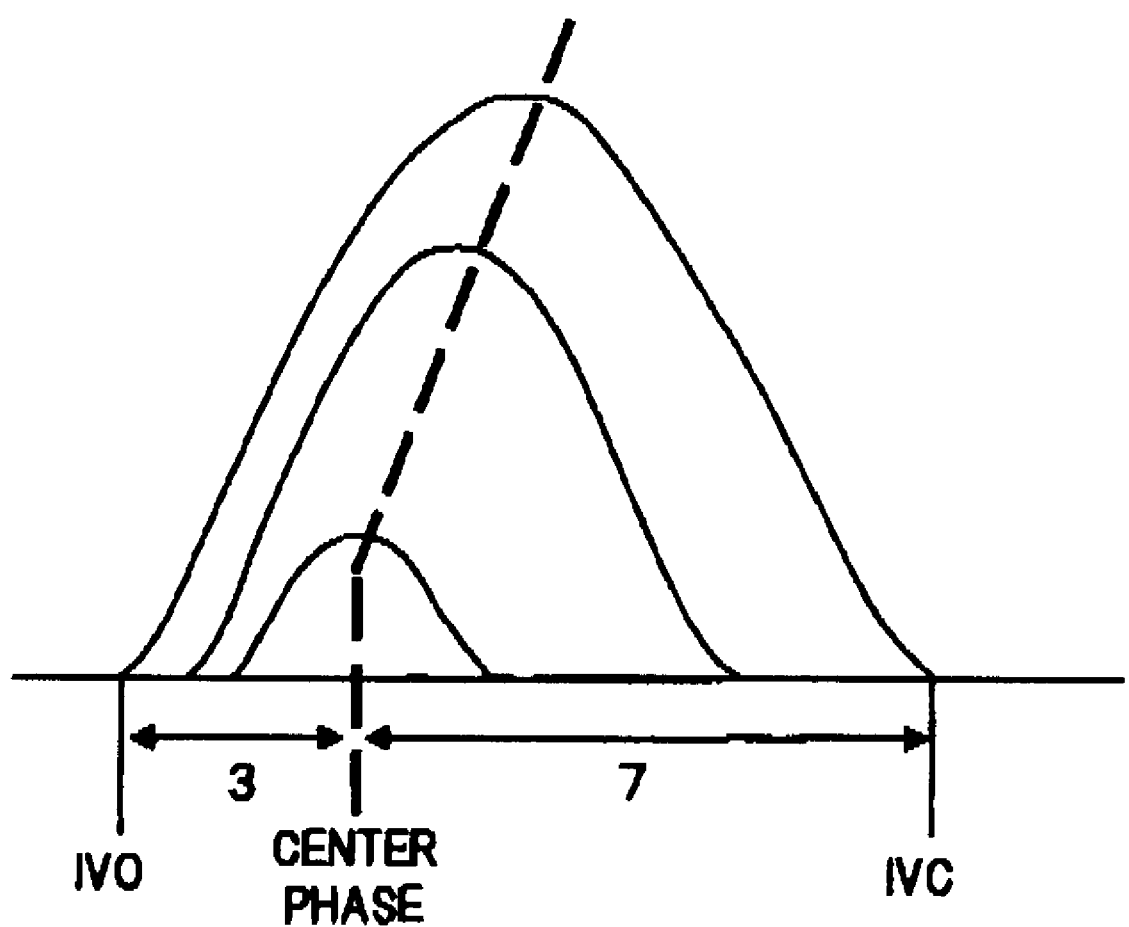
FIG. 15 is a graphical view illustrating variation characteristics of the valve operation angle and the valve lift amount of the intake valve according to the embodiment of the present invention.

Incidentally, VEL 112 of the present embodiment has characteristics that the center phase is retarded in response to the increase in the valve operation angle, and it is preferable to set the above-mentioned ratio RIVO to be 30%, as shown in FIG. 15.

By setting ratio RIVO to be 30%, a response at a transient operation, fuel-saving benefit at the transient operation, and an engine-stall resistance at engine cooling time and at engine deceleration time, can be simultaneously achieved.

In the followings, effects obtained by setting ratio RIVO to be 30% will be described in detail.

Regarding Improvement of Response at Transient Operation

Figure 16:
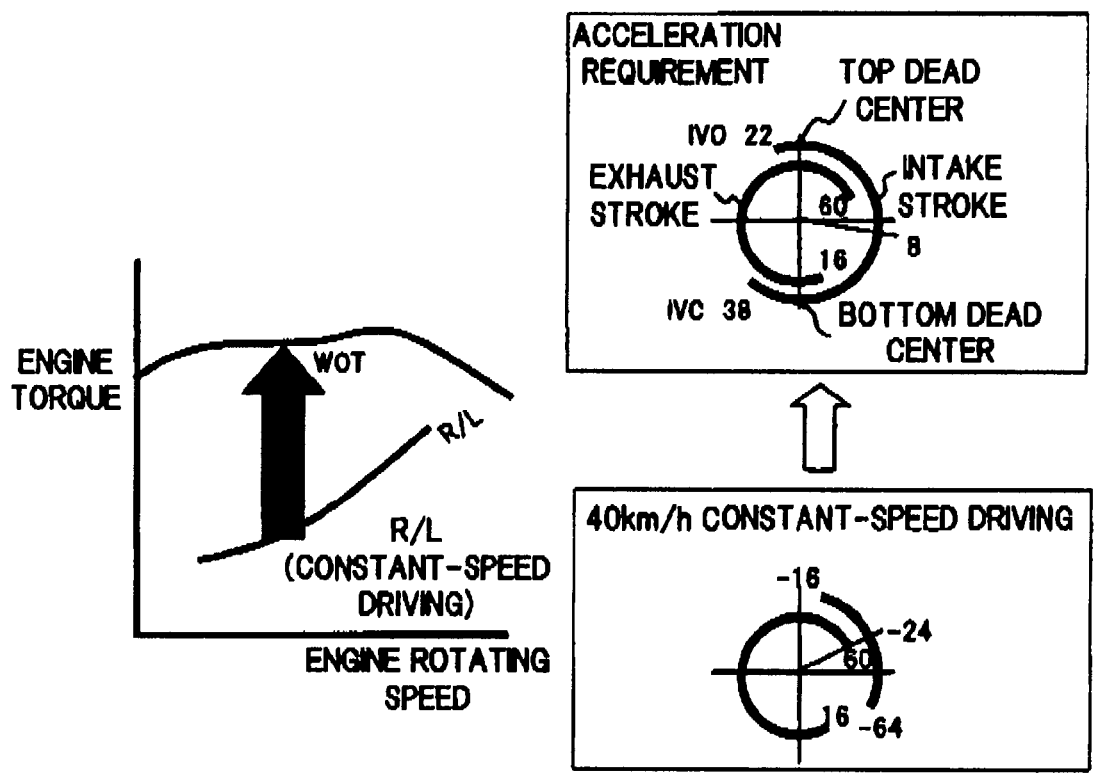
FIG. 16 is a diagrammatic view for indicating a variation in an opening timing of the intake valve in the case where the intermediate-load operation is shifted to the full throttle operation according to the embodiment of the present invention.

As shown in FIG. 16, in order to achieve fuel-saving at a constant-speed operation at a vehicle speed of 40 km/h, for example, it is desired to retard opening timing IVO of intake valve 105 to an angle after the top dead center, to thereby reduce valve overlap, so that a fresh air amount and a fuel injection amount are reduced, and it is also desired to advance closing timing IVC of intake valve 105 to an angle before the intake bottom dead center, to thereby reduce a pumping loss.

On the other hand, when an acceleration requirement occurs, it is preferable to increase the valve lift amount/valve operation angle of intake valve 105 to increase the intake air amount, and to retard closing timing IVC of intake valve 105 to an angle after the intake bottom dead center to improve a filling efficiency inside the cylinder by the inertia supercharging effect.

Thus, when the engine is accelerated from the steady state, a faster control response of valve overlap amount is required, and more particularly, it is important to improve responsiveness of the retard change of closing timing IVC of intake valve 105.

Here, as shown in FIG. 15, by employing VEL 112 having characteristics that the center phase is retarded in response to the increase in the valve operation angle/valve lift amount of intake valve 105, the valve operation angle of intake valve 105 is increased in response to the acceleration requirement, resulting that the center phase can be simultaneously retarded, and further, the phase can be operated in the retard direction by VTC 113.

Thus, since the retard change of the phase operated by VEL 112 and the retard change of the phase operated by VTC 113 simultaneously occur, response of retard change of closing timing IVC at the time of acceleration becomes faster, and thus, closing timing IVC can be retarded to an angle after the intake bottom dead center and the inertia supercharging effect can be obtained immediately, so that the acceleration response can be improved.

Figure 17:
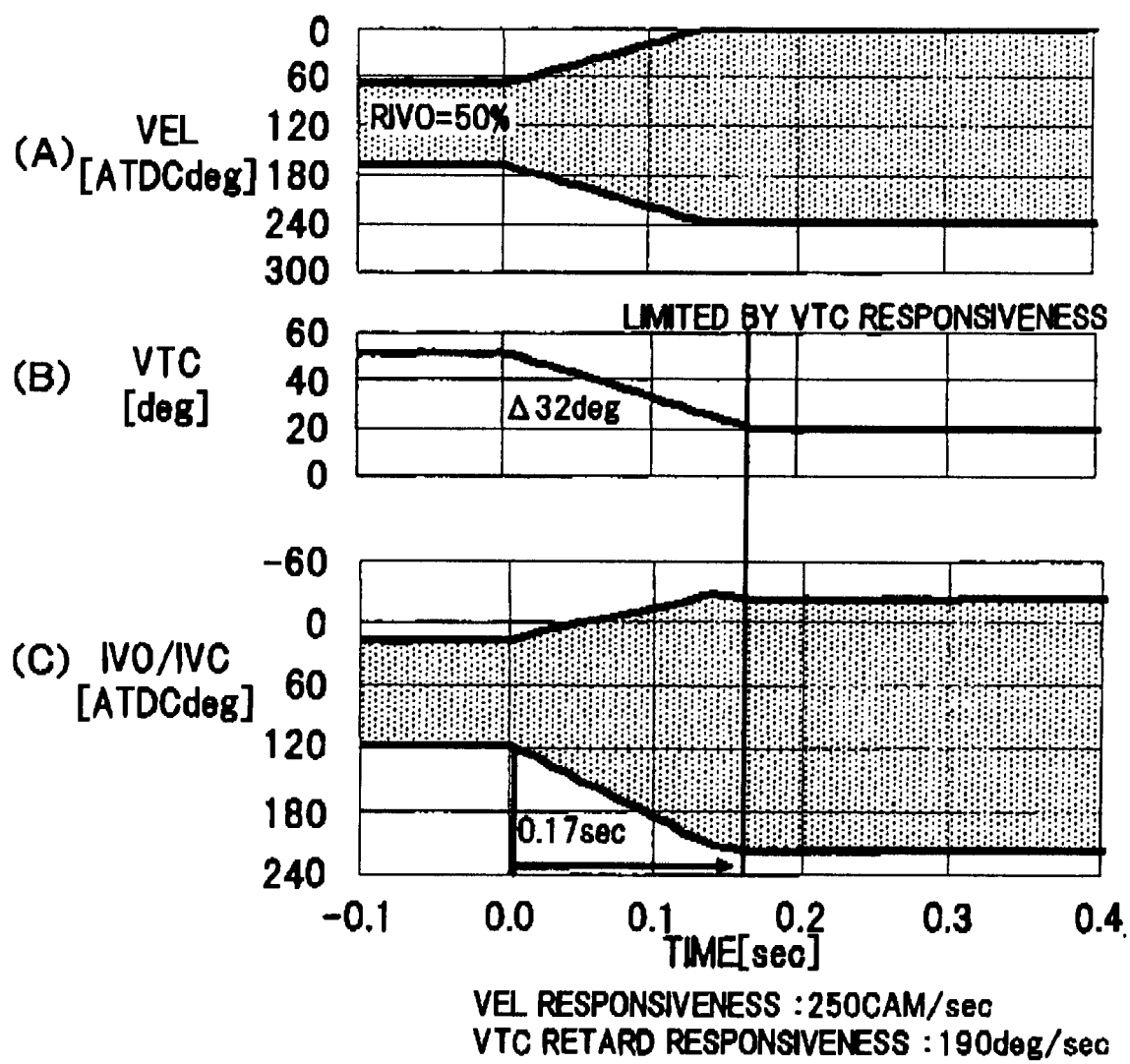
FIG. 17 is a time chart illustrating a variation in opening timing IVO of the intake valve caused by the shift from the intermediate-load operation to the full throttle operation, when a ratio RIVO, which is a ratio of a change amount of opening timing IVO to a change amount of the valve operation angle, is set to 50%, according to the embodiment of the present invention.

FIG. 17 shows the change in valve operation angle performed by VEL 112, the change in advance amount of phase operated by VTC 113, and the change in opening timing IVO/closing timing IVC of intake valve 105, in the case where the engine employing VEL 112 in which ratio RIVO is set to be 50% and the center phase does not vary while the valve operation angle is increased is used and where the operating state is changed from the constant-speed operation at immediate-lode to the operating state where the accelerator pedal is fully operated.

Figure 18:
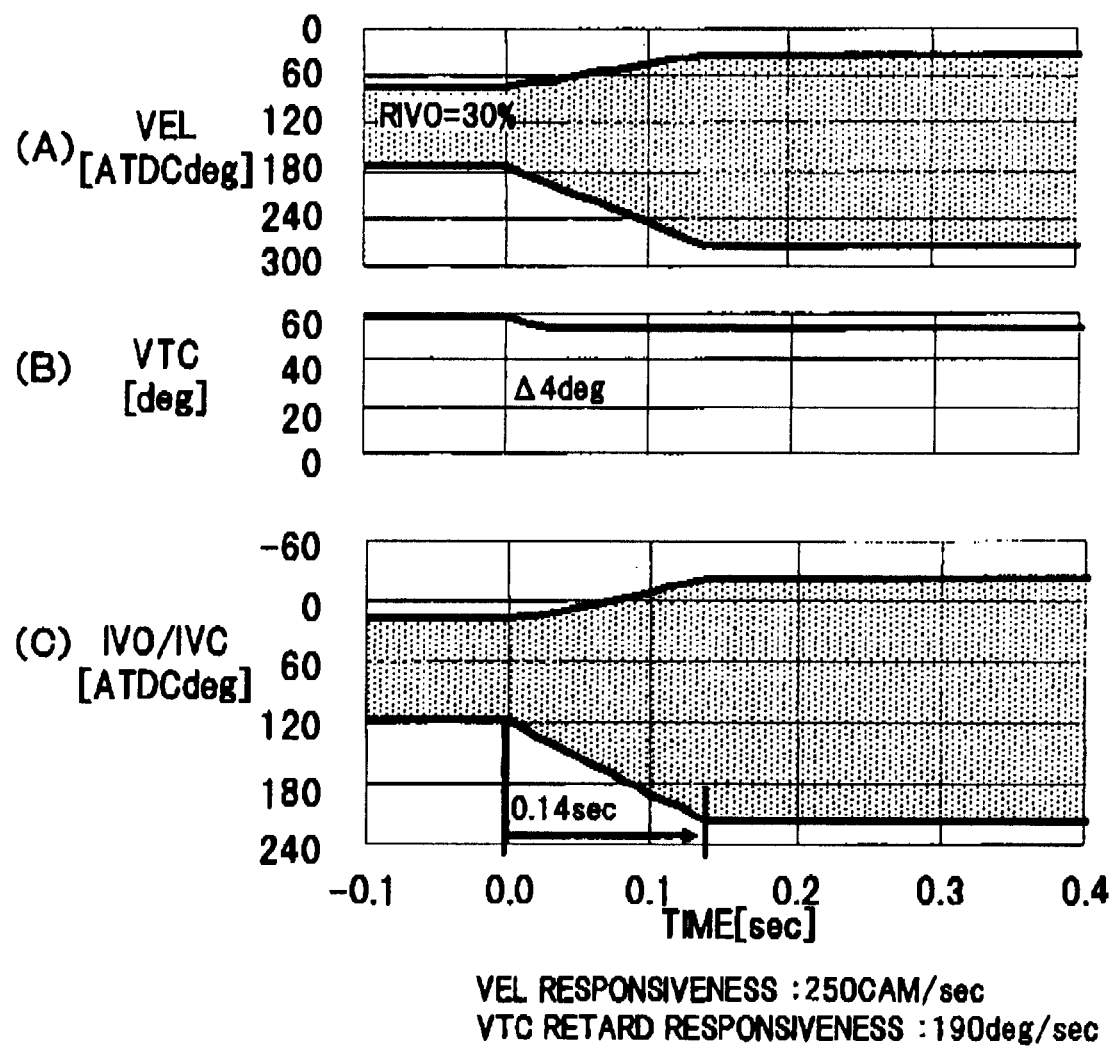
FIG. 18 is a time chart illustrating the variation in the opening timing of the intake valve caused by the shift from the intermediate-load operation to the full throttle operation, when ratio RIVO is set to be 30%, according to the embodiment of the present invention.

Furthermore, FIG. 18 shows the change in valve operation angle operated by VEL 112, the change in advance amount of phase operated by VTC 113, and the change in opening timing IVO/closing timing IVC of intake valve 105, in the case where the engine employing VEL 112 in which ratio RIVO is set to be 30% and the center phase varies to be retarded in response to the increase in the valve operation angle is used and where the operating state is changed from the constant-speed operation at immediate-lode to the operating state where the accelerator pedal is fully operated.

In the case where ratio RIVO is set to be 50% as shown in FIG. 17(A), opening timing IVO and closing timing IVC vary at equal rate. Then, in order to vary the center phase to the target, VTC 113 retards the phase for 32 deg as shown In FIG. 17(B).

Accordingly, even when the valve operation angle reaches the target, closing timing IVC does not reach the target value until VTC 113 completes to retard the phase for 32 deg. In this example, it takes 0.17 sec to reach the target closing timing IVC (see FIG. 17(C)).

In contrast, in the case where ratio RIVO is set to be 30%, the center phase is retarded in response to the increase in the valve operation angle as shown in FIG. 18(A), and thus, the manipulated variable that is needed to be retarded by VTC 113 can be reduced. In the example shown in FIG. 18(B), VTC 113 retards the phase for only 4 deg, thereby achieving closing timing IVC to reach the target value.

Thus, as shown in FIG. 18(C), since no delay in reaching the target value as caused by the delay in response of VTC 113 occur. It takes only 0.14 sec to reach the target closing timing IVC, which is faster than that in the case where ratio RIVO is set to be 50%.

Hence, by employing VEL 112 that retards the center phase in response to the increase in the valve operation angle of intake valve 105, time before reaching the target closing timing IVC can be reduced and the inertia supercharging effect cam be obtained sooner, so that the response of acceleration can be improved.

Figure 19:
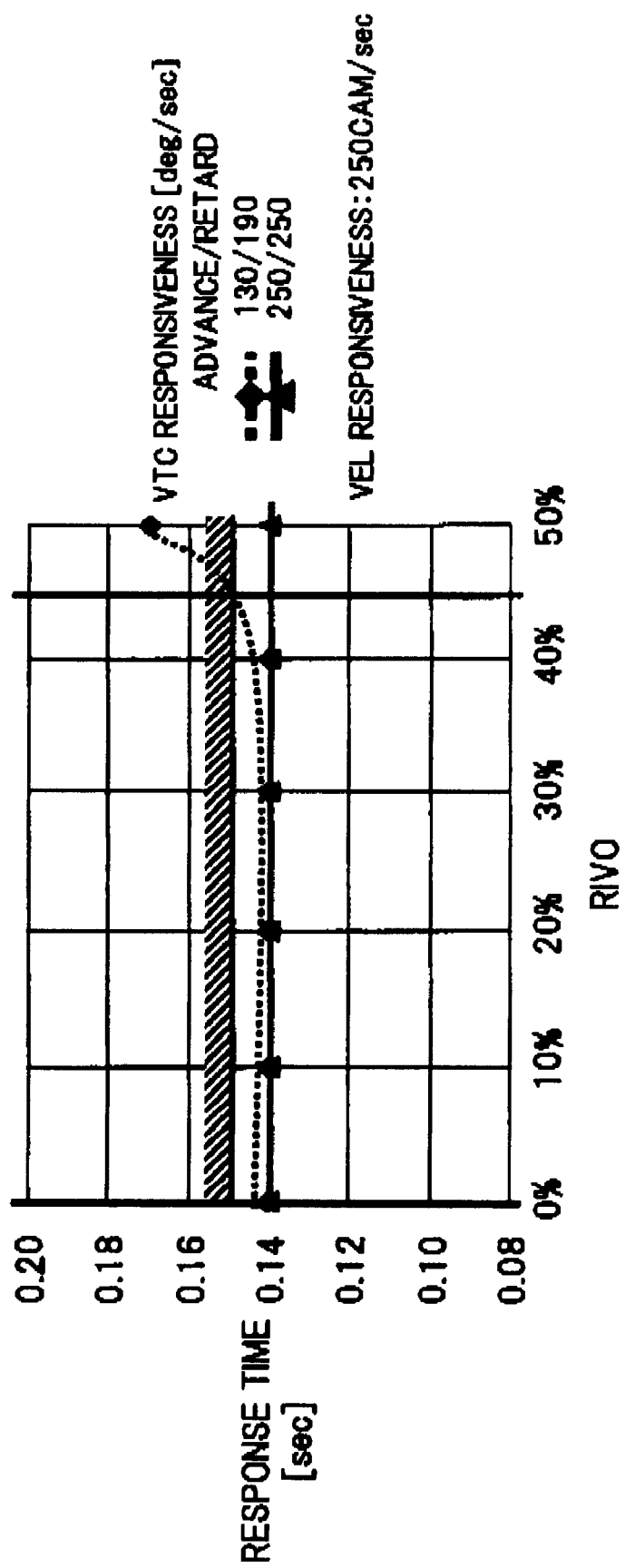
FIG. 19 is a graphical view illustrating a correlation between ratio RIVO and a response time of an intake air amount according to the embodiment of the present invention.

FIG. 19 shows a diagrammatic view indicating the relationship between ratio RIVO/RIVC and a response time of intake air amount.

In FIG. 19, the characteristics that ratio RIVO is set to be 0% and ratio RIVC is set to be 100% are such characteristics that opening timing IVO of intake valve 105 is constant and only closing timing IVC varies in order to vary the valve operation angle of intake valve 105 by VEL 112. The characteristics that both ratios RIVO and RIVC are set to be 50% are such characteristics that the center phase does not vary even when the valve operation angle is varied by VEL 112.

Each of the dotted line and the solid line in FIG. 19 indicates the response time of VTC 113 with different response speeds. The dotted line indicates the characteristics that have relatively slow response speed and the characteristics of the vane-type variable valve timing mechanism employed in the present embodiment.

As ratio RIVO approaches 50%, the retard manipulated variable required by VTC 113 becomes large. Thus, as shown in FIG. 19 by the dotted line, if VTC 113 has slower response speed and if ratio RIVO exceeds 40%, time required for retarding the phase for the desired angle by VYC 113 becomes longer than the time required for varying the valve operation angle. Accordingly, the delay in reaching target closing timing IVC might occur, and thus, the longer response time might be required.

Thus, in the combination of VEL 112 and VTC 113 of the present embodiment, it is preferable to set ratio RIVO within the range from 0% to 40%, in order to shorten the response time required for varying the intake air amount and improve the response.

Regarding Fuel-Saving at Transient Operation

In investigating the fuel consumption at the transient operation, suppose that the vehicle is in an operation pattern shifting from the acceleration state by stepping on the accelerator pedal to the constant-speed operation by decelerating by releasing the accelerator pedal, namely, in the operation pattern opposite to that indicated in FIG. 16.

In this operation pattern, closing timing IVC of intake valve 105 is quickly advanced from an angle after the bottom dead center to an angle before the bottom dead center, so that the pumping loss can be reduced and thus the fuel consumption can be reduced. Moreover, by employing VEL 112 configured to retard the center phase in response to the increase in the valve operation angle, closing timing IVC can be quickly advanced, and accordingly, the reduction of the fuel consumption can be achieved.

Figure 20:
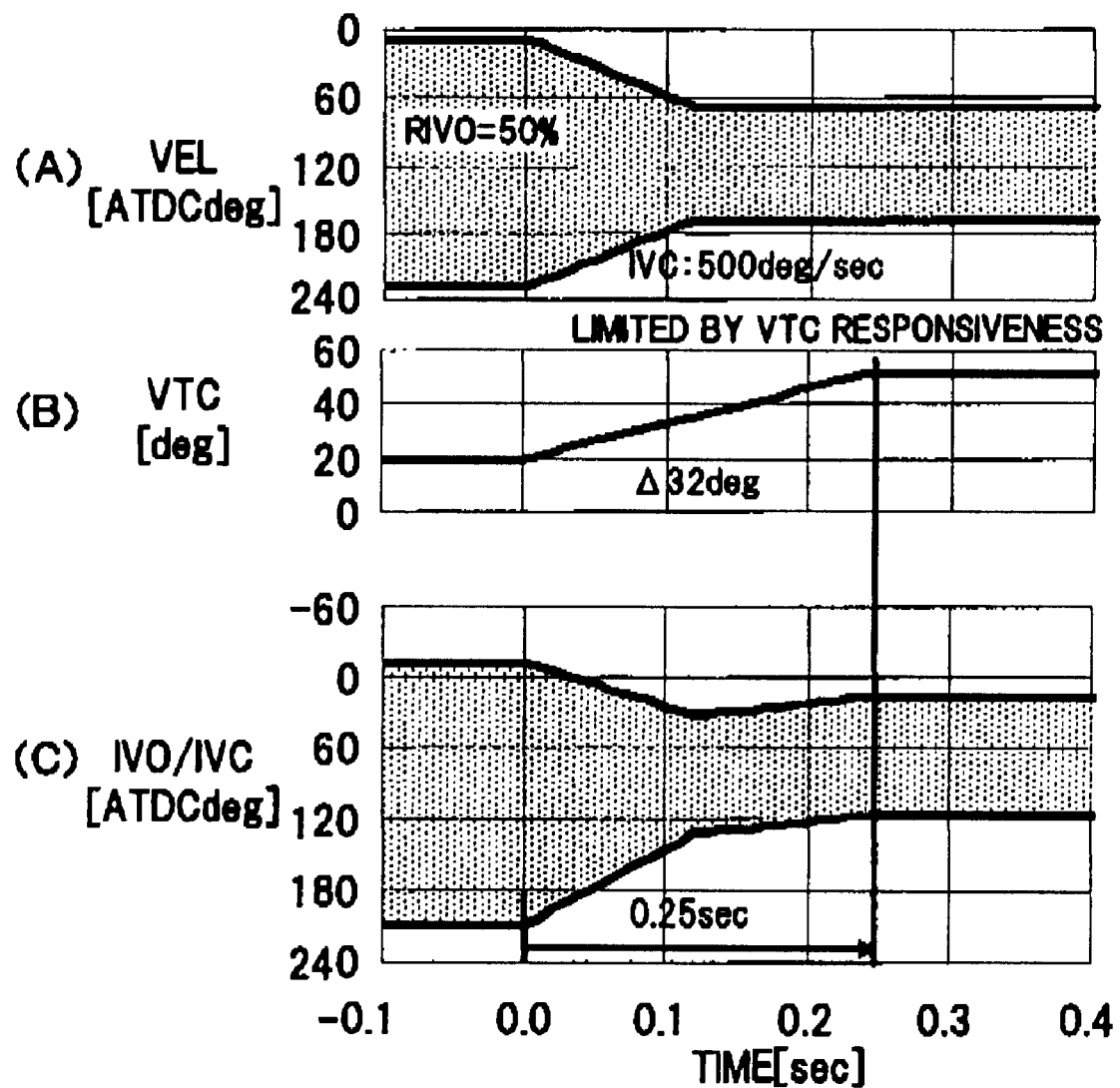
FIG. 20 is a time chart illustrating the variation in the opening timing of the intake valve caused by the shift from an acceleration operation to a constant-speed operation, when ratio RIVO is set to be 50%, according to the embodiment of the present invention.
Figure 21:
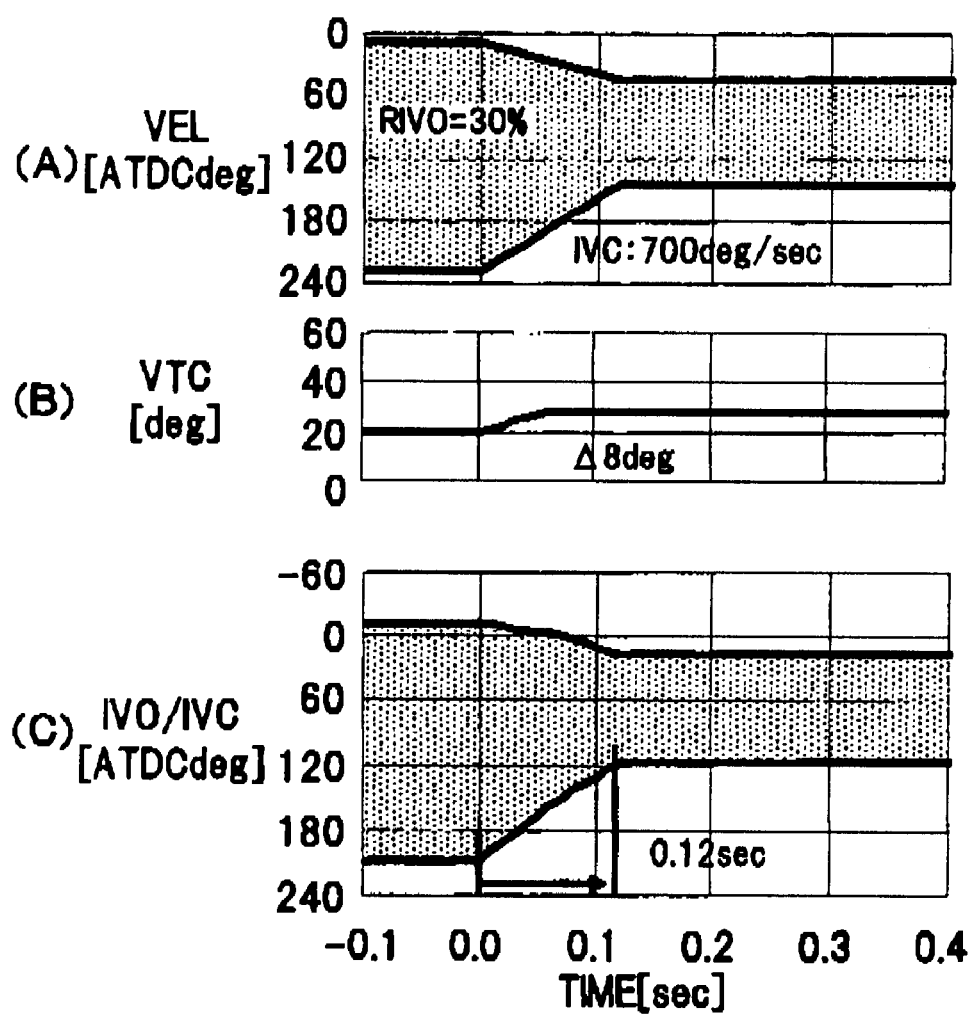
FIG. 21 a time chart illustrating a variation in the opening timing of the intake valve caused by the shift from the acceleration operation to the constant-speed operation, when ratio RIVO is set to be 30%.

FIGS. 20 and 21 show the change in valve operation angle operated by VEL 112, the change In advance amount of phase operated by VTC 113, and the change in opening timing IVO/closing timing IVC of intake valve 105, during deceleration. FIG. 20 shows the case where ratio RIVO is 50%, and FIG. 21 shows the case where ratio RIVO is 30%.

In the case where there is employed VEL 112 in which the center phase does not vary while the valve operation angle is varied, namely, ratio RIVO is set to be 50%, it is necessary to advance the phase for 32 deg by VTC 113, as shown in FIG. 20(B). The time required for advancing the phase for 32 deg limits the time required for closing timing IVC to reach the target timing, and thus closing timing IVC takes 0.25 sec to be advanced to the target timing.

In contrast, in the case where there is employed VEL 112 in which ratio RIVO is set to be 30%, since the center phase is advanced in response to the decrease in the valve operation angle, VTC 113 is required to advance the phase for only 8 deg (see FIG. 21(B)), and accordingly, closing timing IVC can be advanced to the target timing in 0.12 sec.

Thus, by employing VEL 112 that advances the center phase in response to the decrease of the valve operation angle, the time required for advancing closing timing IVC to the target timing can be reduced, and thus, the fuel consumption during deceleration can be reduced.

Figure 22:
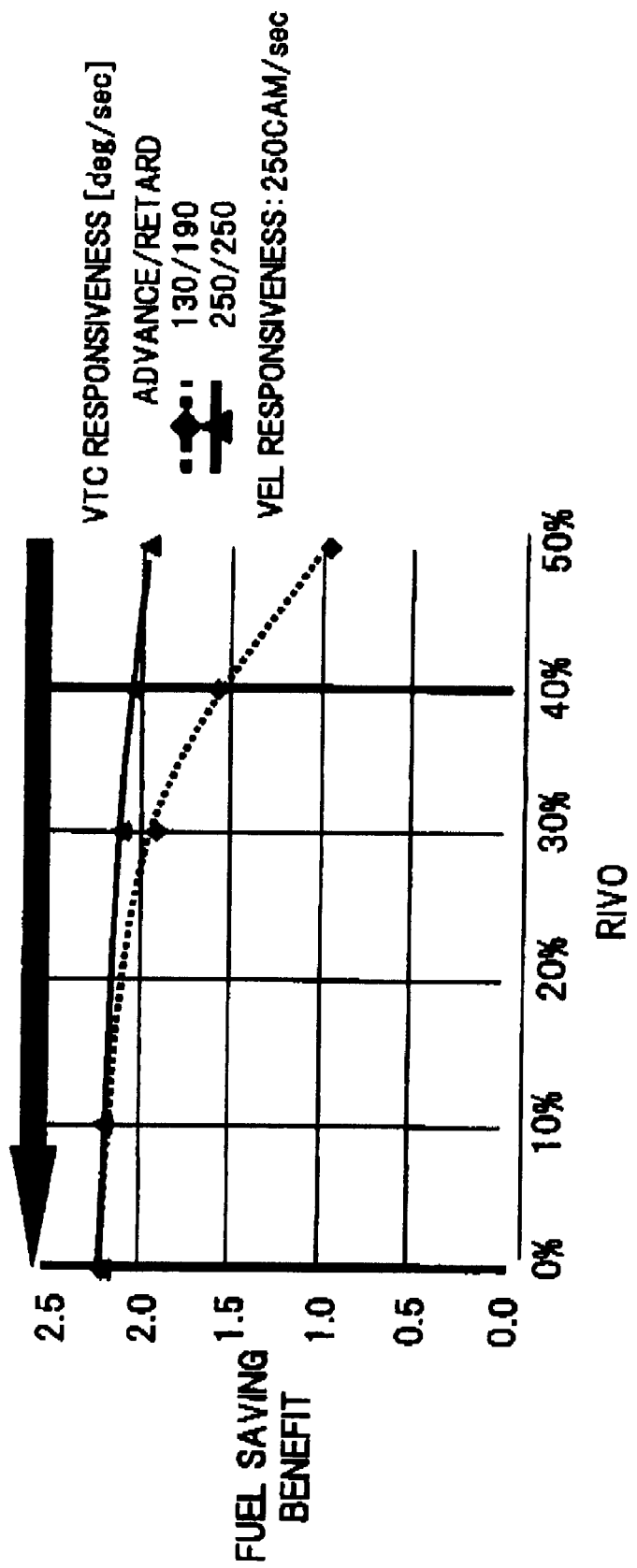
FIG. 22 is a graphical view illustrating a correlation between ratio RIVO and a fuel saving benefit according to the embodiment of the present invention.

FIG. 22 shows a correlation between ratio RIVO and the fuel saving benefit, and shows rapid decrease in the fuel saving benefit from the time point where ratio RIVO exceeds 30%. Thus, it is preferable to set ratio RIVO within the range from 0% to 30%.

In other words, when ratio RIVO exceeds 30%, the time required for performing advance operation by VTC 113 exceeds the time required for decreasing the valve operation angle, and thus, for this excess in time, the delay in advancing the closing timing IVC to the target timing occurs.

On the other hand, when ratio RIVO is 30% or less, the time required for performing advance operation by VTC 113 is less than the time required for decreasing the valve operation angle, and thus, closing timing IVC can be advanced to the target timing with good response, so that the pumping loss can be decreased quickly, and accordingly, the fuel consumption can be reduced.

In the vertical axis of FIG. 22 representing the fuel saving benefit, as the value gets greater, the fuel consumption becomes less.

Regarding Engine Stall Resistance

Figure 23:
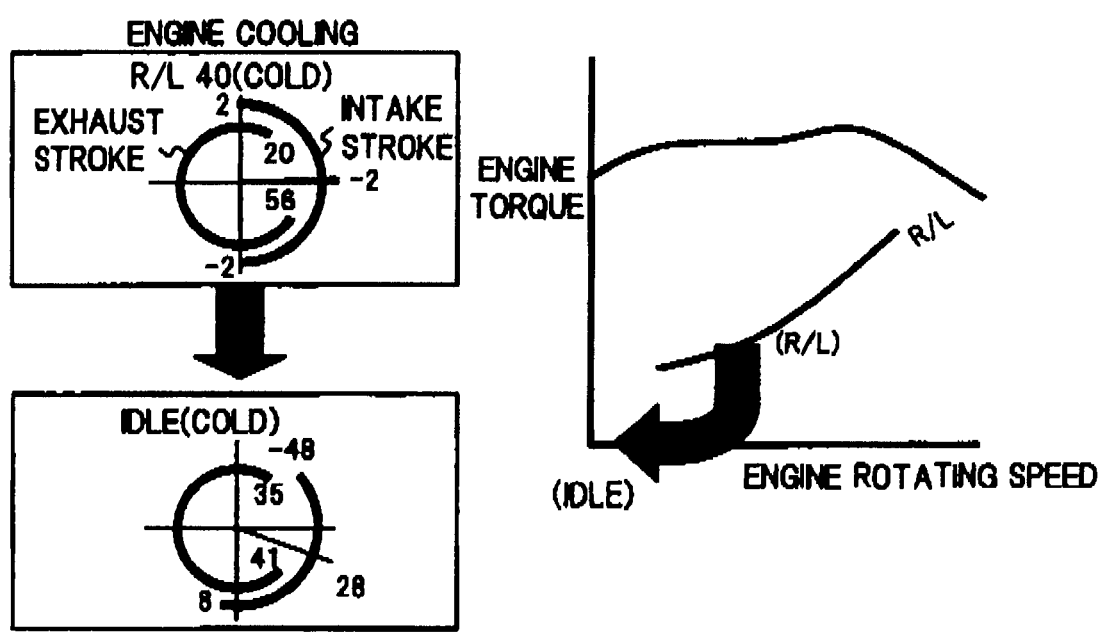
FIG. 23 is a diagrammatic view for indicating the variation in the opening timing of the intake valve in the case where the intermediate-load operation is shifted to an idle operation according to the embodiment of the present invention.

FIG. 23 shows the difference in opening timing of intake valve 105 between the constant-speed operating state at the vehicle speed of 40 km/h and an idle operating state, at engine cooling time.

During idle operation, in order to ensure the combustion stability, it is preferable to set opening timing IVO and dosing timing IVC of intake valve 105 in a manner that: the valve overlap amount is decreased to reduce the residual gas amount in a cylinder and introduce more fresh air therein; and closing timing IVC of intake valve 105 is set at the vicinity of the top dead center, to thereby improve an effective compression ratio.

Thus, in the operation pattern shifting from the constant-speed operation to the idle operation by releasing the accelerator pedal to be fully closed, it is necessary to quickly retard opening timing IVO of intake valve 105, to thereby quickly reduce the valve overlap amount, in order to maintain the engine stall resistance.

However, in the case where VEL 112 that retards the center phase in response to the increase in the valve operation angle, the center phase is advanced in response to the decrease in the valve operation angle. Thus, although opening timing IVO is required to be retard quickly, VEL 112 is operated in the direction of advancing the opening timing IVO, and thus, this movement of VEL 112 hinders opening timing IVO from being retarded.

Figure 24:
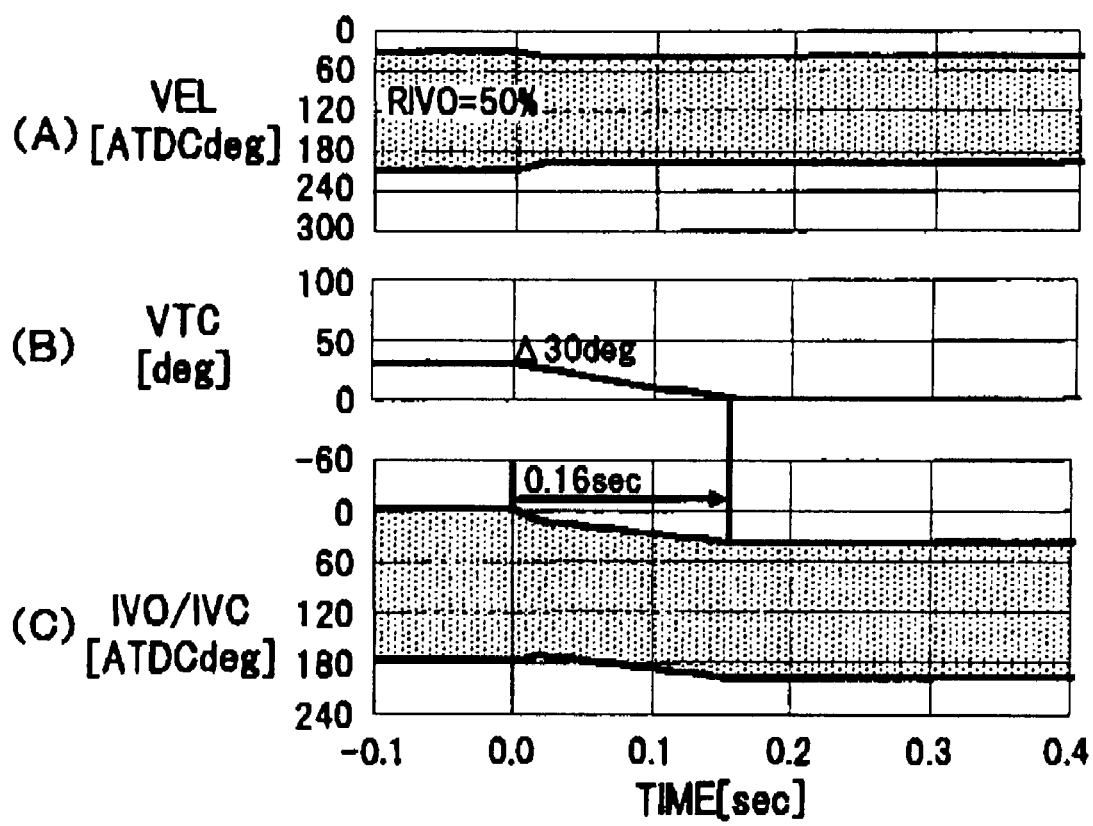
FIG. 24 is a time chart illustrating the variation in the opening timing of the intake valve caused by the shift from the intermediate-load operation to the idle operation, when ratio RIVO is set to be 50%, according to the embodiment of the present invention.
Figure 25:
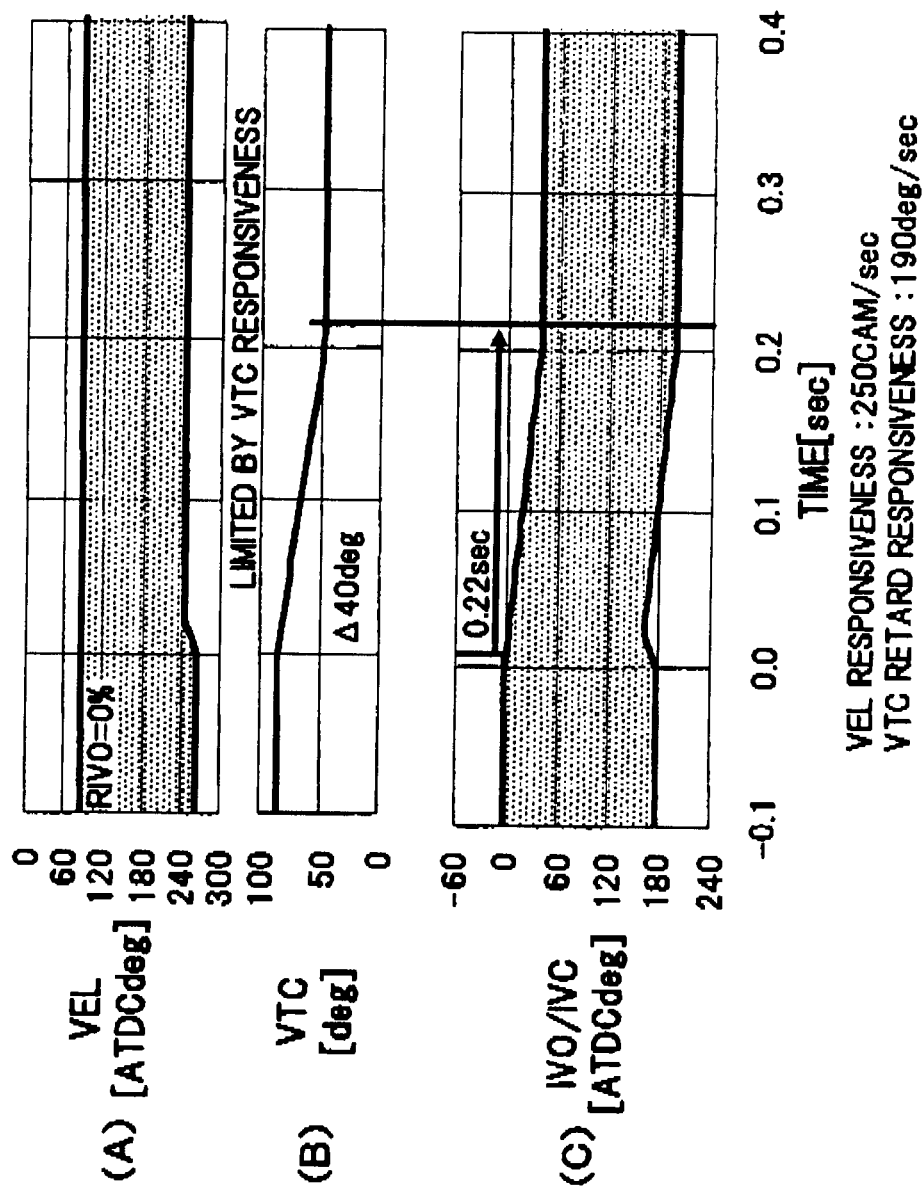
FIG. 25 is a time chart illustrating the variation in the opening timing of the intake valve caused by the shift from the intermediate-load operation to the idle operation, when a ratio RIVO is set to be 0%, according to the embodiment of the present invention.

FIGS. 24 and 25 show the change in valve operation angle operated by VEL 112, the change in advance amount of phase operated by VTC 113, and the change in opening timing IVO/dosing timing IVC of intake valve 105, in the operation pattern shifting from the constant-speed operation to the idle operation. FIG. 24 shows the case where ratio RIVO is 50%, and FIG. 25 shows the case where ratio RIVO is 0%.

As shown in FIG. 24, in the case where there is employed VEL 112 in which both ratio RIVO and ratio RIVC are set to be 50% and the center phase does not vary while the valve operation angle varies, opening timing IVO can be retarded to the target timing by retarding the phase for only 30 deg by VTC 113. In contrast, in the case where there is employed VEL 112 in which ratio RIVO is set to be 0% so that opening timing IVO does not vary while the valve operation angle varies and the valve operation angle is decreased by advancing closing timing IVC, it is necessary to retard the phase for 40 deg by VTC 113.

Then, because of the difference in the required retard manipulated variable of the VTC 113, if ratio RIVO is 50%, opening timing IVO takes 0.16 sec to reach the target timing, whereas if ratio RIVO is 0%, opening timing IVO takes 0.22 sec to reach the target timing. Thus, from the viewpoint of engine stall resistance, it is undesirable to set ratio RIVO to an extremely small value.

Figure 26:
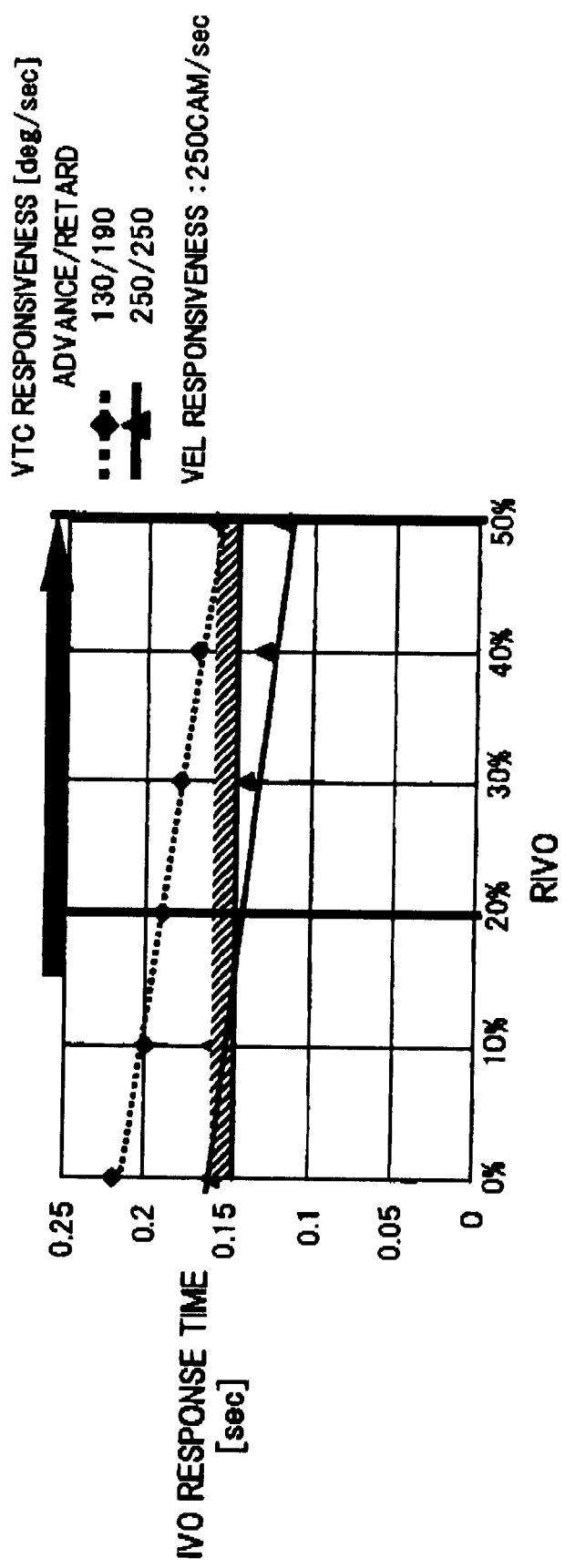
FIG. 26 is a graphical view illustrating a correlation between ratio RIVO and the response time of opening timing IVO according to the embodiment of the present invention.

Here, the response time for varying opening timing IVO can fall within the allowable range if ratio RIVO is set within the range from 20% to 50%, as shown in FIG. 26.

As described above, as ratio RIVO approaches 50% from 0%, the response and fuel consumption at the transient operation get worse, on the other hand, as ratio RIVO approaches 0%, the engine stall resistance gets worse.

Further, for substantially satisfying the response at the transient operation, the low fuel consumption at the transient operation, and the engine stall resistance, ratio RIVO can be set within the range from 20% to 40%, and more preferably, ratio RIVO is set to be 30%.

Therefore, in the present embodiment, by using VEL 112 in which ratio RIVO is set to be 30%, the response at the transient operation, the low fuel consumption at the transient operation, and the engine stall resistance can be achieved well at the same time.

The entire contents of Japanese Patent Application No. 2008-136850, filed May 26, 2008 are incorporated herein by reference.

While only selected embodiments have been chosen to illustrate the present invention, it will be apparent to those skilled in the art from this disclosure that various change and modification can be made without departing from the scope of the invention as defined in the appended claims.

Furthermore, the foregoing description of the embodiments according to the present invention is provided for illustrating purpose only, and not for the purpose of limiting the invention defined by the appended claims and its equivalents.

We claim:

1. A variable operation angle mechanism provided for varying a valve operation angle of an intake valve, comprising an arrangement thereof in which;
   the variable operation angle mechanism advances a center phase of the valve operation angle in response to a decrease in the valve operation angle; and
   a control is executed in a manner such that a ratio of a change amount of an opening timing of the intake valve to a change amount of the valve operation angle is set to be equal to or more than 20% and equal to or less than 40%.

2. The variable operation angle mechanism according to claim 1,
   wherein the ratio of 40% is an upper limit that is set by the control, based on a response at a transient operation of an engine, and the ratio of 20% is a lower limit that is set by the control for an engine stall resistance.

3. The variable operation angle mechanism according to claim 1,
   wherein the control is executed so that the ratio of the change amount of the opening timing of the intake valve to the change amount of the valve operation angle is set to be 30%.

4. The variable operation angle mechanism according to claim 3,
   wherein the ratio of 30% Is an upper limit that is set by the control, based on a fuel consumption at the transient operation of the engine.

5. The variable operation angle mechanism according to claim 1,
   wherein the variable operation angle mechanism comprises a mechanism configured to vary the valve operation angle of the intake valve together with a valve lift amount thereof, so that a decrease in the valve operation angle and advancing of the center phase of the valve operation angle take place in response to a decrease in the valve lift amount.

6. A controlling apparatus for an engine provided with the variable operation angle mechanism according to claim 1, and a variable valve timing mechanism that varies a rotating phase of an intake camshaft relative to a crankshaft, comprising:
- a detecting unit that detects an operating state of the engine;
- a target value calculating unit that calculates a target value of the valve operation angle and a target value of the rotating phase, based on the operating state of the engine;
- a correction value calculating unit that calculates a correction value for correcting the target value of the rotating phase, based on the target value of the valve operation angle;
- a correcting unit that corrects the target value of the rotating phase by the correction value;
- a valve operation angle controlling unit configured to calculate and output a manipulated variable of the variable operation angle mechanism, based on the target value of the valve operation angle; and
- a valve timing controlling unit configured to calculate and output a manipulated variable of the variable valve timing mechanism, based on the corrected target value of the rotating phase corrected by the correction value.

7. The controlling apparatus for an engine according to claim 6,
wherein the correction value calculated by the correction value calculating unit is provided for correcting the target value of the rotating phase In an advance direction to a greater degree, as the target value of the valve operation angle increases.

8. The controlling apparatus for an engine according to claim 6,
wherein the correction value calculating unit has a conversion table incorporated therein for converting the target value of the valve operation angle into the correction value, the conversion table being used for setting the correction value which corresponds to the target value of the valve operation angle.

9. The controlling apparatus for an engine according to claim 6, wherein the correction value calculating unit calculates the correction value based on: the target value of the valve operation angle; an opening timing, a closing timing and a valve operation angle of both of the variable operation angle mechanism and the variable valve timing mechanism while both are at a default state, respectively: and a ratio of a change amount of the opening timing of the intake valve to a change amount of the valve operation angle.

10. A method of controlling an engine provided with the variable operation angle mechanism according to claim 1, and a variable valve timing mechanism that varies a rotating phase of an intake camshaft relative to a crankshaft, comprising the steps of:
- detecting an operating state of the engine;
- calculating a target value of a valve operation angle and a target value of the rotating phase, based on the operating state of the engine;
- calculating a correction value for correcting the target value of the rotating phase, based on the target value of the valve operation angle;
- correcting the target value of the rotating phase by the correction value;
- calculating a manipulated variable of the variable operation angle mechanism, based on the target value of the valve operation angle; and
- calculating a manipulated variable of the variable valve timing mechanism based on the corrected target value of the rotating phase corrected by the correction value.

11. The method of controlling an engine according to claim 10,
wherein the step of calculating the correction value is executed to obtain a correction value for correcting the target value of the rotating phase in an advance direction to a greater degree, as the target value of the valve operation angle increases.

12. The method of controlling an engine according to claim 10,
wherein the step of calculating the correction value comprises the step of:
converting the target value of the valve operation angle into the correction value by using a conversion table.

13. The method of controlling an engine according to claim 10,
wherein the step of calculating the correction value is executed to obtain the correction value, based on: the target value of the valve operation angle; an opening timing, a closing timing and a valve operation angle of both of the variable operation angle mechanism and the variable valve timing mechanism while both are at a default state, respectively; and a ratio of a change amount of the opening timing of the intake valve to a change amount of the valve operation angle.

14. A controlling apparatus for an engine provided with the variable operation angle mechanism according to claim 1, and a variable valve timing mechanism that varies a rotating phase of an intake camshaft relative to a crankshaft, comprising:
- detecting means for detecting an operating state of the engine;
- target value calculating means for calculating a target value of the valve operation angle and a target value of the rotating phase, based on the operating state of the engine;
- correction value calculating means for calculating a correction value for correcting the target value of the rotating phase, based on the target value of the valve operation angle;
- correcting means for correcting the target value of the rotating phase by the correction value;
- valve operation angle controlling means for calculating and outputting a manipulated variable of the variable operation angle mechanism, based on the target value of the valve operation angle; and
- valve timing controlling means for calculating and outputting a manipulated variable of the variable valve timing mechanism, based on the corrected target value of the rotating phase corrected by the correction value.

* * * * *